(12) United States Patent
Ohta et al.

(10) Patent No.: US 10,863,485 B2
(45) Date of Patent: Dec. 8, 2020

(54) RADIO COMMUNICATION DEVICE, RADIO COMMUNICATION SYSTEM, AND RADIO COMMUNICATION METHOD

(71) Applicant: FUJITSU LIMITED, Kawasaki (JP)

(72) Inventors: Yoshiaki Ohta, Yokohama (JP);
Yoshihiro Kawasaki, Kawasaki (JP);
Yoshinori Tanaka, Yokohama (JP);
Shinichiro Aikawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/021,912

(22) Filed: Jun. 28, 2018

(65) Prior Publication Data
US 2018/0324790 A1    Nov. 8, 2018

Related U.S. Application Data

(63) Continuation of application No. PCT/JP2016/050658, filed on Jan. 12, 2016.

(51) Int. Cl.
*H04W 72/04*    (2009.01)
*H04L 5/00*    (2006.01)
*H04L 1/16*    (2006.01)
*H04W 80/06*    (2009.01)
*H04L 29/06*    (2006.01)
(Continued)

(52) U.S. Cl.
CPC ....... *H04W 72/0413* (2013.01); *H04L 1/1671* (2013.01); *H04L 1/1812* (2013.01); *H04L 5/0055* (2013.01); *H04L 69/16* (2013.01); *H04W 28/0273* (2013.01); *H04W 72/04* (2013.01); *H04W 80/06* (2013.01)

(58) Field of Classification Search
None
See application file for complete search history.

(56) References Cited

U.S. PATENT DOCUMENTS

2006/0292992 A1    12/2006    Tajima et al.
2010/0074215 A1    3/2010    Park et al.
2011/0128931 A1    6/2011    Ishii et al.
(Continued)

FOREIGN PATENT DOCUMENTS

EP    1 959 693 A1    8/2008
EP    1959693 A1 *    8/2008    ........... H04L 1/1685
(Continued)

OTHER PUBLICATIONS

Yang et al., "Methods of UE Operation with Pre-Grant based UL scheduling", U.S. Appl. No. 62/254,752, filed Nov. 13, 2015 (Year: 2015).*
(Continued)

*Primary Examiner* — Thinh D Tran
(74) *Attorney, Agent, or Firm* — Myers Wolin, LLC.

(57) ABSTRACT

A radio communication device includes: a communication circuit configured to transmit and receive a signal to and from other radio communication device; and a control circuit configured to cause the communication circuit to transmit, through a control channel in a first layer, first acknowledgement information to the other radio communication device, the first acknowledgement information indicating whether data in a second layer different from the first layer is normally received from the other radio communication device.

13 Claims, 18 Drawing Sheets

(51) Int. Cl.
  *H04L 1/18* (2006.01)
  *H04W 28/02* (2009.01)

(56) References Cited

U.S. PATENT DOCUMENTS

| | | | |
|---|---|---|---|
| 2012/0082145 | A1 | 4/2012 | Chen et al. |
| 2013/0016672 | A1 | 1/2013 | Yang et al. |
| 2013/0022011 | A1 | 1/2013 | Enomoto et al. |
| 2013/0083753 | A1 | 4/2013 | Lee et al. |
| 2013/0195065 | A1* | 8/2013 | Park .................. H04L 5/001 370/329 |
| 2013/0242894 | A1 | 9/2013 | Kikuchi |
| 2014/0133447 | A1 | 5/2014 | Moulsley et al. |
| 2014/0177565 | A1 | 6/2014 | Zeira et al. |
| 2014/0355539 | A1 | 12/2014 | Yang et al. |
| 2015/0110034 | A1* | 4/2015 | Yang .................. H04L 1/1861 370/329 |
| 2015/0208386 | A1 | 7/2015 | Yang et al. |
| 2016/0050054 | A1* | 2/2016 | Wager ................ H04L 5/0035 455/450 |
| 2016/0135172 | A1* | 5/2016 | Sun .................... H04W 74/006 370/329 |
| 2016/0302219 | A1 | 10/2016 | Nihei |
| 2016/0366682 | A1 | 12/2016 | Tseng et al. |
| 2018/0070367 | A1 | 3/2018 | Fujishiro et al. |
| 2018/0145796 | A1* | 5/2018 | Liang ................. H04L 1/1812 |
| 2018/0295608 | A1* | 10/2018 | Nguyen ............... H04L 5/001 |
| 2018/0332577 | A1* | 11/2018 | Yang .................. H04L 5/0055 |

FOREIGN PATENT DOCUMENTS

| | | |
|---|---|---|
| EP | 2 681 865 | 1/2014 |
| EP | 3 065 452 A1 | 9/2016 |
| JP | 8-242200 A | 9/1996 |
| JP | 2007-6080 A | 1/2007 |
| JP | 2009-164816 A | 7/2009 |
| JP | 2009-290615 A | 12/2009 |
| JP | 2011-511528 A | 4/2011 |
| JP | 2013-514717 A | 4/2013 |
| JP | 2013-529412 A | 7/2013 |
| JP | 2013-197829 A | 9/2013 |
| JP | 2014-522205 A | 8/2014 |
| JP | 2014-531856 A | 11/2014 |
| JP | 2015-501116 A | 1/2015 |
| JP | 2015-80278 A | 4/2015 |
| JP | 2015-513273 A | 4/2015 |
| JP | 2015-88992 A | 5/2015 |
| WO | 2007/117888 A2 | 10/2007 |
| WO | 2012/118356 A2 | 9/2012 |
| WO | 2013/138043 A1 | 9/2013 |
| WO | 2014/191050 A1 | 12/2014 |
| WO | 2015/098102 A1 | 7/2015 |

OTHER PUBLICATIONS

3GPP TS 36.213 V13.0.0, "3 Generation Partnership Project; Technical Specification Group Radio Access Network; Evolved Universal Terrestrial Radio Access (E-ULTRA); Physical Layer procedures (Release 13)", Jan. 5, 2016, XP051047451, pp. 225-299.

Extended European search report with supplementary European search report and the European search opinion issued by the European Patent Office for corresponding European Patent Application No. 16884871.1, dated Nov. 22, 2018.

International Search Report with Written Opinion of the International Searching Authority issued by the Japanese Patent Office for corresponding International Patent Application No. PCT/JP2016/050658, dated Feb. 23, 2016, with a partial English translation.

Non-final Office Action issued by the USPTO for corresponding U.S. Appl. No. 16/026,385, dated Aug. 2, 2019.

Communication pursuant to Article 94(3) EPC issued by the European Patent Office for corresponding European Patent Application No. 16 884 871.1-1213, dated Oct. 2, 2019.

Ericsson et al., "On the use of aperiodic and periodic CSI feedback and the impact on periodic CSI dropping" Agenda Item: 7.2.1.2.1, 3GPP TSG-RAN WG1 Meeting #68bis, R1-121010, Jeju, Republic of Korea, Mar. 26-30, 2012.

Nokia Siemens Networks et al., "On remaining details for PUSCH multiple antenna transmission", Agenda Item: 6.2.3, 3GPP TSG-RAN WG1 Meeting #63bis, R1-110438, Dublin, Ireland, Jan. 17-21, 2011.

Notification of Reasons for Refusal issued by the Japan Patent Office for corresponding Japanese Patent Application No. 2017-561082, dated May 21, 2019, with an English translation.

Japanese Office Action issued for corresponding Japanese Patent Application No. 2017-561083, dated Jun. 11, 2019 with Full English Machine Translation.

Notice of Reasons for Refusal issued for corresponding Japanese Patent Application No. 2017-561082, dated Aug. 6, 2019, with full English Machine Translation attached.

Notice of Reasons for Refusal issued for corresponding Japanese Patent Application No. 2017-561082, dated Aug. 6, 2019 with full English Machine Translation.

Non-Final Office Action issued by the USPTO for corresponding U.S. Appl. No. 16/026,385 and electronically delivered dated Aug. 2, 2019.

3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015.

3GPP TS 36.211 V12.5.0, "3rd Generation Partnership Project; Technical Specification Group Radio Access Network; Evolved Universal Terrestrial Radio Access (E-UTRA); Physical channels and modulation (Release 12)", Mar. 2015.

3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)", Mar. 2015.

3GPP TS 36.213 V12.5.0, "3rd Generation Partnership Project; Technical Specification Group Radio Access Network; Evolved Universal Terrestrial Radio Access (E-UTRA); Physical layer procedures (Release 12)", Mar. 2015.

3GPP TS 36.321 V12.5.0, "3rd Generation Partnership Project; Technical Specification Group Radio Access Network; Evolved Universal Terrestrial Radio Access (E-UTRA); Medium Access Control (MAC) protocol specification (Release 12)", Mar. 2015.

3GPP TS 36.322 V12.2.0, "3rd Generation Partnership Project; Technical Specification Group Radio Access Network; Evolved Universal Terrestrial Radio Access (E-UTRA); Radio Link Control (RLC) protocol specification (Release 12)", Mar. 2015.

3GPP TS 36.323 V12.3.0, "3rd Generation Partnership Project; Technical Specification Group Radio Access Network; Evolved Universal Terrestrial Radio Access (E-UTRA); Packet Data Convergence Protocol (PDCP) specification (Release 12)", Mar. 2015.

3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015.

3GPP TS 36.413 V12.5.0, "3rd Generation Partnership Project; Technical Specification Group Radio Access Network; Evolved Universal Terrestrial Radio Access Network (E-UTRAN); S1 Application Protocol (S1AP) (Release 12)", Mar. 2015.

3GPP TS 36.423 V12.5.0, "3rd Generation Partnership Project; Technical Specification Group Radio Access Network; Evolved Universal Terrestrial Radio Access Network (E-UTRAN); X2 application protocol (X2AP) (Release 12)", Mar. 2015.

3GPP TR 36.842 V12.0.0, "3rd Generation Partnership Project; Technical Specification Group Radio Access Network; Study on Small Cell enhancements for E-UTRA and E-UTRAN; Higher layer aspects (Release 12)", Dec. 2013.

Information Sciences Institute, "Transmission Control Protocol", RFC793, Darpa Internet Program, Protocol Specification, Sep. 1981.

International Search Report with Written Opinion of the International Searching Authority issued by the Japan Patent Office for

(56) References Cited

OTHER PUBLICATIONS corresponding International Patent Application No. PCT/JP2016/050657, dated Feb. 23, 2016, with a partial English translation.
Extended European search report with supplementary European search report and the European search opinion issued by the European Patent Office issued for corresponding European Patent Application No. 16884870.3, dated Nov. 6, 2018.
Decision of Refusal issued by the Japan Patent Office for corresponding Japanese Patent Application No. 2017-561083, dated Dec. 10, 2019, with an English translation.
"Notice of Termination of Reconsideration by Examiners before Appeal Proceedings" dated Apr. 28, 2020 by the Japan Patent Office, and the Reconsideration Report by Examiner before Appeal for corresponding Japanese Patent Application No. 2017-561083, with a full machine English translation.
Communication pursuant to Article 94(3) EPC issued by the European Patent Office for corresponding European Patent Application No. 16 884 870.3-1218, dated Feb. 12, 2020.
First Notification of Office Action issued by the China National Intellectual Property Administration for corresponding Chinese Patent Application No. 201680078457.1, dated Jun. 3, 2020, with full English translation attached.
Notice of Reasons for Refusal issued by the Japan Patent Office for corresponding Japanese Patent Application No. 2017-561082, dated Sep. 29, 2020, with a full machine English translation.

\* cited by examiner

| COMPONENT | DESCRIPTION | TIME [ms] |
|---|---|---|
| S11 | AVERAGE DELAY TO NEXT SR OPPORTUNITY (5ms PUCCH CYCLE) | 2.5 |
| S12 | UE SENDS SCHEDULING REQUEST | 1 |
| S13 | eNB DECODES SCHEDULING REQUEST AND GENERATES THE SCHEDULING GRANT | 3 |
| S14 | TRANSMISSION OF SCHEDULING GRANT | 1 |
| S15 | UE PROCESSING DELAY (DECODING OF SCHEDULING GRANT + L1 ENCODING OF UL DATA) | 3 |
| S16 | TRANSMISSION OF UL DATA | 1 |
| | TOTAL DELAY | 11.5 |

FIG. 12

| PATTERN | DL TCP DATA | RECEPTION OF MOBILE STATION | AIR (PUCCH) | | RECEPTION OF BASE STATION | |
|---|---|---|---|---|---|---|
| | | HARQ | HARQ A/N | TCP ACK | HARQ | ARQ |
| 1 | SN=N: Tx | OK | ACK | SN=N | OK | OK |
| 2 | SN=N: Tx | OK | ACK | SN=N | NACK | - |
| | HARQ Re | OK | ACK | SN=N | OK | OK |
| 3 | SN=N: Tx | ERROR | NACK | - | NACK | - |
| | HARQ Re | ERROR | NACK | - | OK | OK |
| 4 | SN=N: Tx | OK | ACK | SN=N | ACK | ERROR |
| | ARQ Re | | | | OK | OK |

Nagle – DELAY ACK PROBLEM

RADIO COMMUNICATION DEVICE, RADIO COMMUNICATION SYSTEM, AND RADIO COMMUNICATION METHOD

CROSS-REFERENCE TO RELATED APPLICATION

This application is a continuation application of International Patent Application No. PCT/JP2016/050658, filed on Jan. 12, 2016 and designated the U.S., the entire contents of which are incorporated herein by reference.

FIELD

The present invention relates to a radio communication device, a radio communication system, and a radio communication method.

BACKGROUND

At present, specifications of Long Term Evolution (LTE) systems or LTE-Advanced (LTE-A) which are based on LTE systems have been completed or examined in 3rd Generation Partnership Project (3GPP) which is a standardization organization. In LTE, Release 12 is drawn up from 3GPP Release 8 as an international specification. After 3GPP Release 10, LTE is called LTE-A. Further, 5th generation (5G) mobile communication which is subsequent to 4th generation (4G) mobile communication has also been started to be examined since 2013.

On the other hand, in data communication, a communication protocol called Transmission Control Protocol/Internet Protocol (TCP/IP) is used in some cases. TCP/IP is, for example, a protocol in which TCP and IP are combined and is used as a standard protocol in the Internet or the like. For example, IP is a communication protocol used to relay packets in the Internet. TCP is a transmission control protocol and is a protocol that provides a communication service in an intermediate layer between an application program and IP.

In TCP, a transmission side transmits TCP data, and a reception side responds with TCP acknowledgement (ACK) when the reception side can normally receive TCP data, and the transmission side receives the TCP ACK and starts transmitting subsequent TCP data. In this way, in TCP, a procedure of "TCP data transmission→TCP ACK response" is regulated. Thus, reliable communication is realized.

Examples of the related art include Non-Patent Literature 1 [3GPP TS36.300 V12.5.0 (2015-03)], Non-Patent Literature 2 [3GPP TS36.211 V12.5.0 (2015-03)], Non-Patent Literature 3 [3GPP TS36.212 V12.4.0 (2015-03)], Non-Patent Literature 4 [3GPP TS36.213 V12.5.0 (2015-03)], Non-Patent Literature 5 [3GPP TS36.321 V12.5.0 (2015-03)], Non-Patent Literature 6 [3GPP TS36.322 V12.2.0 (2015-03)], Non-Patent Literature 7 [3GPP TS36.323 V12.3.0 (2015-03)], Non-Patent Literature 8 [3GPP TS36.331 V12.5.0 (2015-03)], Non-Patent Literature 9 [3GPP TS36.413 V12.5.0 (2015-03)], Non-Patent Literature 10 [3GPP TS36.423 V12.5.0 (2015-03)], Non-Patent Literature 11 [3GPP TR36.842 V12.0.0 (2013-12)], and Non-Patent Literature 12 [RFC793].

SUMMARY

According to an aspect of the invention, a radio communication device includes: a communication circuit configured to transmit and receive a signal to and from other radio communication device; and a control circuit configured to cause the communication circuit to transmit, through a control channel in a first layer, first acknowledgement information to the other radio communication device, the first acknowledgement information indicating whether data in a second layer different from the first layer is normally received from the other radio communication device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of a pattern including an ACK/NACK error.

DESCRIPTION OF EMBODIMENTS

According to an aspect of the present description, provided are technologies for shortening a delay time taken to transmit TCP ACK.

According to another aspect of the present description, provided are technologies for improving throughput of TCP.

Hereinafter, embodiments will be described in detail with reference to the drawings. Problems and embodiments of the present specification are exemplary and do not limit the scope of the rights of the present application. In particular, when the expressions are the same technically despite differences in the expressions of the description, the technology of the present application can be applied despite the different expressions and does not limit the scope of the rights.

As terms used in the present specification or technical content described in the present specification, terms or technical content described in the specification may be appropriately used as a standard of communication in 3GPP or the like. As examples of the specification, there are NPLs 1 to 12 described above.

For NPLs 1 to 11 described above, the non-patent literatures described above may be used, but are frequently updated day by day. Thus, terms or technical content described in NPLs 1 to 11 issued immediately before the present application was filed may be appropriately used in the specification of the present application.

An overview of each of NPLs 1 to 12 is as follows.

That is, NPL 1 (3GPP TS36.300 V12.5.0 (2015-03)) describes, for example, an overall specification of LTE-Advanced.

NPL 2 (3GPP TS36.211 V12.5.0 (2015-03)) describes, for example, the specification of a physical layer (PHY) channel (or a physical channel) of LTE-A.

NPL 3 (3GPP TS36.212 V12.4.0 (2015-03)) describes, for example, the specification of PHY encoding of LTE-A.

NPL 4 (3GPP TS36.213 V12.5.0 (2015-03)) describes, for example, the specification of a PHY procedure of LTE-A.

NPL 5 (3GPP TS36.321 V12.5.0 (2015-03)) describes, for example, the specification of medium access control (MAC) of LTE-A.

NPL 6 (3GPP TS36.322 V12.2.0 (2015-03)) describes, for example, the specification of radio link control (RLC) of LTE-A.

NPL 7 (3GPP TS36.323 V12.3.0 (2015-03)) describes, for example, the specification of the packet data convergence protocol (PDCP) of LTE-A.

NPL 8 (3GPP TS36.331 V12.5.0 (2015-03)) describes, for example, the specification of radio resource control (RRC) of LTE-A.

NPL 9 (3GPP TS36.413 V12.5.0 (2015-03)) describes, for example, the specification of S1 of LTE-A.

NPL 10 (3GPP TS36.423 V12.5.0 (2015-03)) describes, for example, the specification of X2 of LTE-A.

NPL 11 (3GPP TR36.842 V12.0.0 (2013-12)) is, for example, a review report of a small cell technology of LTE-A.

NPL 12 (RFC793) describes, for example, the specification of TCP.

First Embodiment

Figure 1:
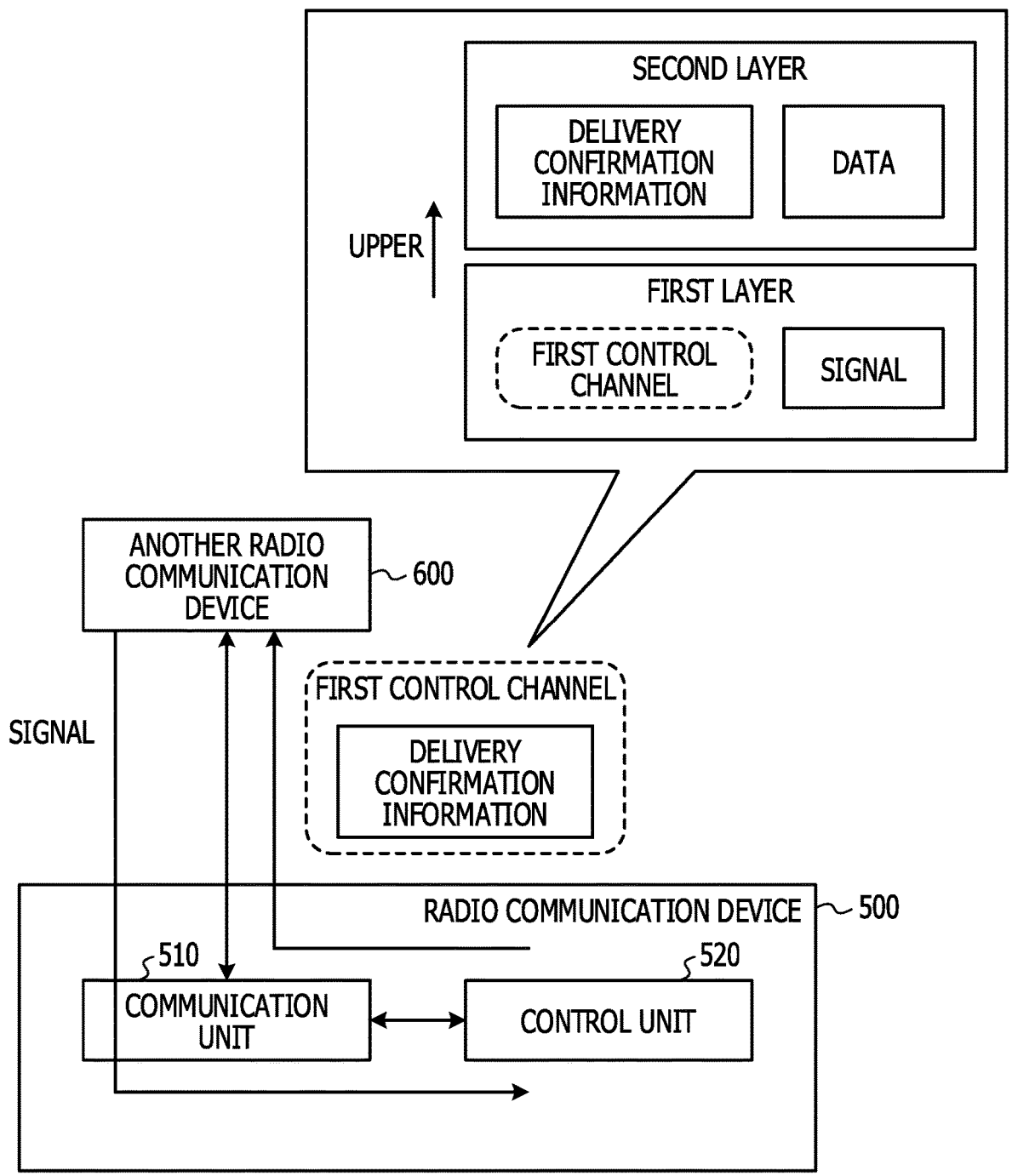
FIG. 1 is a diagram illustrating a configuration example of a radio communication system.

FIG. 1 is a diagram illustrating a configuration example of a radio communication system 10 according to the first embodiment. A radio communication system 10 includes a radio communication device 500 and another radio communication device 600. The radio communication device 500 and the other radio communication device 600 execute radio communication. For example, the radio communication device 500 may be a mobile station device and the other radio communication device 600 may be a base station device, or the radio communication device 500 may be a base station device and the other radio communication device 600 may be a mobile station device.

The radio communication device 500 includes a communication unit (may be referred to as "a first processing unit") 510 and a control unit (may be referred to as "a second processing unit") 520.

The communication unit 510 transmits and receives a signal in a first layer and data of a second layer which is an upper layer of the first layer and delivery confirmation information (may be referred to as "acknowledgement information") for the data.

The control unit 520 enables delivery confirmation information for data of the second layer to be transmitted from the communication unit 510 to the other radio communication device 600 using a first control channel of the first layer used to transmit the control information.

The radio communication device 500 executes a scheduling request procedure with the first radio communication device 600 when information is transmitted using the shared channel. In the scheduling request procedure, for example, the following procedure is executed. That is, when the radio communication device 500 transmits a scheduling request to the other radio communication device 600 and the other radio communication device 600 receives the scheduling request, scheduling information for the radio communication device 500 is generated. The other radio communication device 600 transmits a UL grant including the scheduling information to the radio communication device 500, and then the radio communication device 500 transmits information using the shared channel according to the scheduling information. The transmission of the delivery confirmation information is delayed in some cases in accordance with the scheduling procedure.

In the first embodiment, the radio communication device 500 can transmit delivery confirmation information of the second layer to the other radio communication device 600 using the first control channel rather than the shared channel. Thus, the radio communication device 500 and the other radio communication device 600 do not execute the scheduling request procedure, and the radio communication device 500 can transmit the delivery confirmation information of the second layer.

Accordingly, in the first embodiment, in the radio communication device 500, the scheduling request procedure for the transmission of the delivery confirmation information can be omitted, and thus it is possible to shorten a delay time in the transmission of the delivery confirmation information. In the first embodiment, by shortening the delay time, it is possible to achieve an improvement in throughput.

For example, as the delivery confirmation information, there is TCP ACK. Accordingly, in the first embodiment, it is possible to achieve shortening of the delay time in the transmission of the TCP ACK. In the first embodiment, by shortening the delay time, it is possible to achieve an improvement in throughput of TCP.

Second Embodiment

Next, a second embodiment will be described.

<Configuration Example of Radio Communication System>

Figure 2:
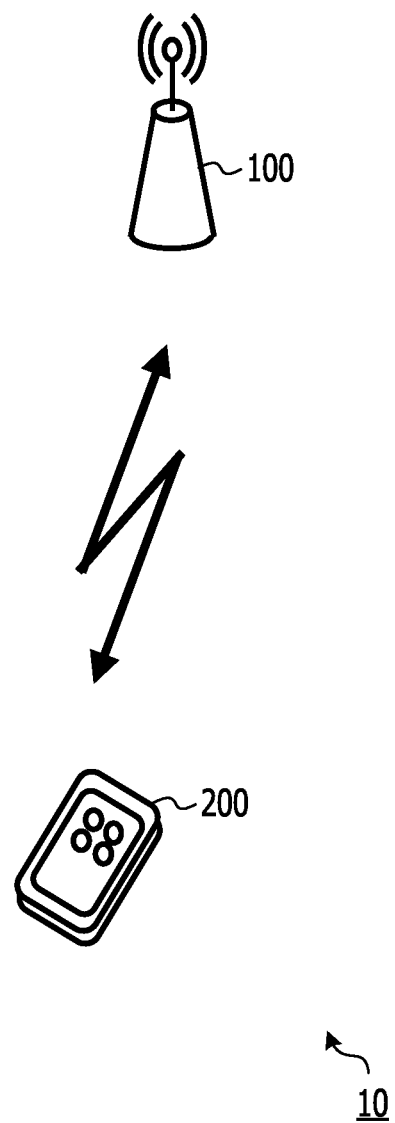
FIG. 2 is a diagram illustrating a configuration example of a radio communication system.

FIG. 2 illustrates a configuration example of the radio communication system 10. The radio communication system 10 includes a base station device (hereinafter referred to as a "base station" in some cases) 100 and a mobile station device (hereinafter referred to as a "mobile station" in some cases) 200.

The base station 100 is, for example, a radio communication device that executes radio communication with the mobile station 200 which resides in a service zone of the base station 100.

The mobile station 200 is, for example, a radio communication device such as a smartphone, a feature phone, a tablet terminal, a personal computer, and a game device. The mobile station 200 executes radio communication with the base station 100 and can is supplied with various services such as a calling service and a browsing service of a web page.

The base station 100 and the mobile station 200 can execute bidirectional communication. That is, communication in a direction from the base station 100 to the mobile station 200 (hereinafter referred to as a "downlink (DL) direction" or a "downward direction" in some cases) and a direction from the mobile station 200 to the base station 100 (hereinafter referred to as an "uplink (UL) direction" or an "upward direction" in some cases) is possible.

The base station 100 executes allocation of radio resources or determination of an encoding scheme and a modulation scheme by executing scheduling in radio communication with the mobile station 200 in the downward direction and the upward direction. The base station 100 transmits a control signal including scheduling information indicating a scheduling result to the mobile station 200. The base station 100 and the mobile station 200 execute radio communication according to the scheduling information included in the control signal.

In the radio communication system 10 illustrated in FIG. 2, an example in which one mobile station 200 executes radio communication with one base station 100 will be described. However, for example, a plurality of mobile stations may execute radio communication with one base station 100. One mobile station 200 may execute radio communication with a plurality of base stations. In the radio communication system 10, a plurality of base stations and a plurality of mobile stations may be included.

<Configuration Example of Base Station Device>

Figure 3:
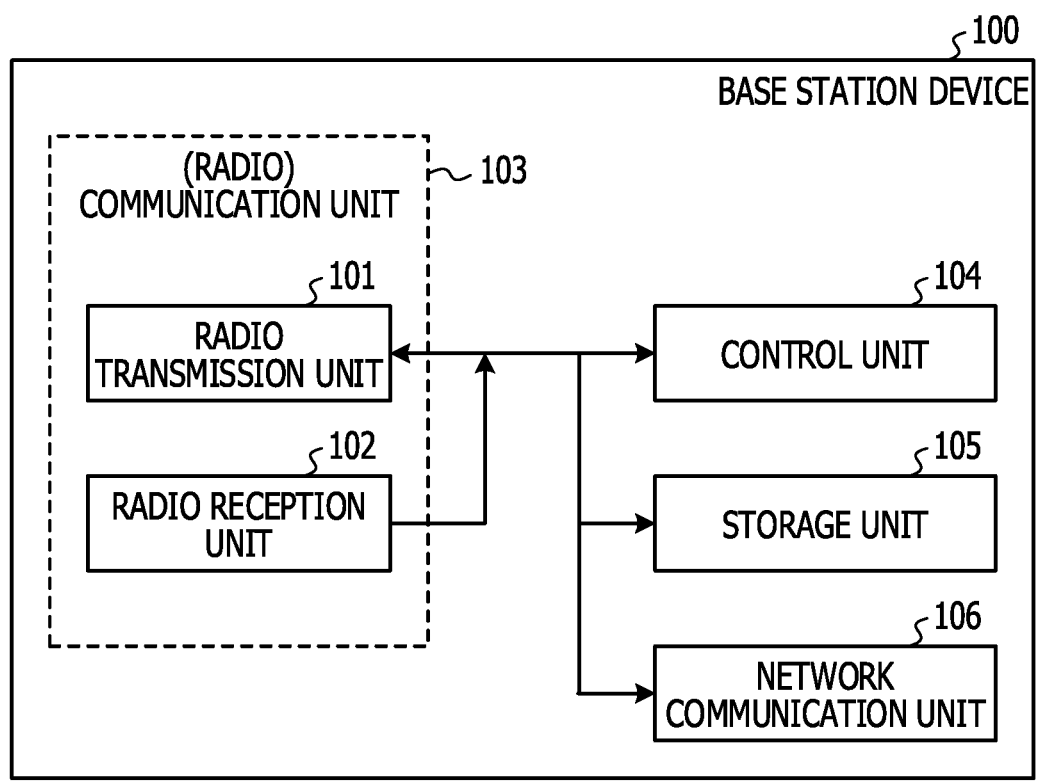
FIG. 3 is a diagram illustrating a configuration example of a base station device.

Next, a configuration example of the base station 100 will be described. FIG. 3 is a diagram illustrating a configuration example of the base station 100. The base station 100 includes a radio transmission unit 101, a radio reception unit 102, a control unit 104, a memory unit 105, and a network communication unit 106. The radio transmission unit 101 and the radio reception unit 102 may be included in a radio communication unit (or a communication unit) 103.

The radio transmission unit 101 executes, for example, an error correction encoding process (hereinafter referred to as an encoding process in some cases), a modulation process, a frequency conversion process, and the like on data read form the memory unit 105 or a control signal output from the control unit 104 to convert the data or the control signal into a radio signal. The radio transmission unit 101 receives the scheduling information including the encoding rate, the modulation scheme, or the like from the control unit 104 and executes an encoding process, a modulation process, and the like according to the scheduling information. Then, the radio transmission unit 101 transmits the converted radio signal to the mobile station 200. In this case, the radio transmission unit 101 receives the scheduling information from the control unit 104 and transmits the radio signal using radio resources included in the scheduling information. The radio resources include, for example, frequency and time resources. For example, the radio transmission unit 101 transmits data or the like using a physical downlink shared channel (PDSCH) and transmits the control signal or the like using a physical downlink control channel (PDCCH).

The radio reception unit 102 receives, for example, a radio signal transmitted from each mobile station 200 using radio resources included in the scheduling information received from the control unit 104. In this case, the radio reception unit 102 receives a radio signal including the control signal or the like using a physical uplink control channel (PUCCH) and receives a radio signal including data using a physical uplink shared channel (PUSCH). The radio reception unit 102 executes a frequency conversion process, a demodulation process, an error correction decoding process (hereinafter referred to as a "decoding process" in some cases), and the like on the received radio signal to extract the data, the control signal, and the like. The radio reception unit 102 receives the scheduling information including the modulation scheme and the encoding rate from the control unit 104 and executes the demodulation process, the decoding process, and the like according to the scheduling information. The radio reception unit 102 outputs, for example, the extracted data, control signal, and the like to the memory unit 105 or the control unit 104.

The control unit 104 executes the above-described scheduling and outputs its result as scheduling information to the radio transmission unit 101 or the radio reception unit 102. The control unit 104 generates the control signal including the scheduling information and outputs the control signal to the radio transmission unit 101. The control signal is transmitted toward the mobile station 200.

Further, the control unit 104 executes retransmission control by a hybrid automatic repeat request (HARQ). The HARQ is, for example, a technology for decoding data which fails in the decoding process on a reception side by combining the data with data retransmitted from a transmission side without discarding the data. For example, when the decoding process for the data succeeds on the reception side, the reception side transmits acknowledge (ACK: a positive response). When the transmission side receives ACK, the transmission side starts transmitting subsequent data. Conversely, when the decoding process fails on the reception side, the reception side responds to the transmission side with negative acknowledge (NACK) and the transmission side receives NACK and retransmits the data. ACK and NACK by HARQ are examples of the delivery confirmation information by HARQ. Retransmission control by HARQ is executed between the base station 100 and the mobile station 200.

A target of the retransmission control by HARQ is, for example, data in a medium access control (MAC) layer. A MAC packet data unit (MAC PDU) is an example of the data. The MAC layer is included in the data link layer (Layer 2) of the OSI reference model.

The control unit 104 executes, for example, retransmission control by HARQ as follows. That is, the radio reception unit 102 notifies the control unit 104 of a processing result indicating whether data can correctly be decoded when the decoding process is executed based on a cyclic redundancy check (CRC) or the like added to the data of the MAC layer. The control unit 104 generates ACK or NACK according to the processing result. The control unit 104 transmits ACK by HARQ (hereinafter referred to as "HARQ ACK" in some cases) or NACK by HARQ (hereinafter referred to as "HARQ NACK" in some cases) to the mobile station 200 via the radio transmission unit 101. On the other hand, when HARQ ACK is received from the base station 200 via the radio reception unit 102, the control unit 104 starts transmitting subsequent data. When HARQ NACK is received from the mobile station 200 via the radio reception unit 102 or when HARQ ACK is not received although a given time has passed after transmission of the data of the MAC layer, the control unit 104 reads the data for which HARQ ACK is not confirmed from the memory unit 105 and retransmits the data to the mobile station 200.

The memory unit 105 stores, for example, the data, the control signal, and the like. For example, the radio reception unit 102, the control unit 104, and the network communication unit 106 appropriately store the data, the control signal, and the like in the memory unit 105. The radio transmission unit 101, the control unit 104, and the network communication unit 106 appropriately read the data, the control signal, and the like stored in the memory unit 105.

The network communication unit 106 is connected to another device and transmits and receives data or the like to and from the other device. At this time, the network communication unit 106 converts the data into packet data with a format which can be output to the other device and transmits the packet data to the other device, or extracts data or the like from packet data received from the other device and outputs the data or the like to the memory unit 105, the control unit 104, or the like. Examples of the other device include another base station device, a mobility management entity (MME), or a serving gateway (SGW).

<Configuration Example of Mobile Station Device>

Figure 4:
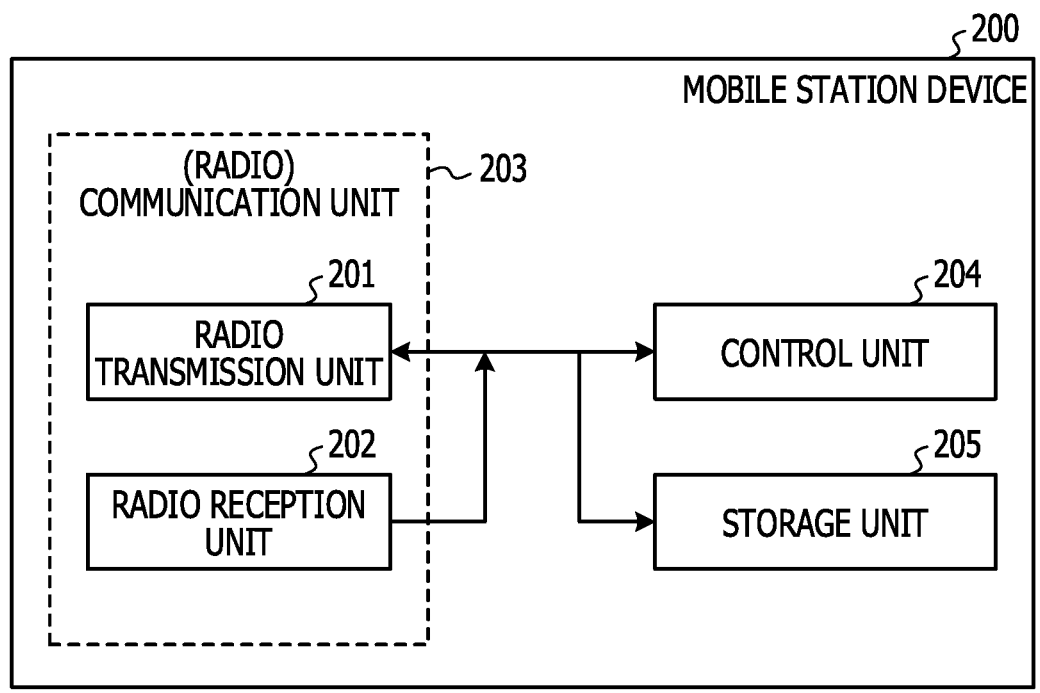
FIG. 4 is a diagram illustrating a configuration example of a mobile station device.

FIG. 4 is a diagram illustrating a configuration example of the mobile station 200. The mobile station 200 includes a radio transmission unit 201, a radio reception unit 202, a control unit 204, and a memory unit 205. The radio transmission unit 201 and the radio reception unit 202 may be included in a radio communication unit (or a communication unit) 203.

For example, the radio transmission unit 201 executes an encoding process, a modulation process, a frequency conversion process, and the like on the data read from the memory unit 205 or the control signal or the like output from the control unit 204 to convert the data, or the control, or the like into a radio signal. The radio transmission unit 201 receives scheduling information including the encoding rate or the modulation scheme from the control unit 204 and executes the encoding process or the modulation process according to the scheduling information. The radio transmission unit 201 transmits the radio signal to the base station 100. In this case, the radio transmission unit 201 receives the scheduling information including the radio resources allocated to the mobile station 200 from the control unit 204 and transmits the radio signal to the base station 100 using the radio resources. For example, the radio transmission unit 201 transmits the control signal or the like using the PUCCH and transmits data or the like using the PUSCH.

The radio reception unit 202 receives the radio signal transmitted from the base station 100. At this time, the radio reception unit 202 receives the scheduling information including the radio resources allocated to the mobile station 200 from the control unit 204 and receives the radio signal using the radio resources. For example, the radio reception unit 202 receives the radio signal including the control signal or the like using the PDCCH and receives the radio signal including the data or the like using the PDSCH. The radio reception unit 202 executes the frequency conversion process, the demodulation process, the decoding process, and the like on the received radio signal to extract the data, the control signal, and the like from the radio signal. At this time, the radio reception unit 202 receives the scheduling information such as the modulation scheme or the encoding rate from the control unit 204 and executes the demodulation process or the decoding process according to the modulation scheme, the encoding rate, and the like. For example, the radio reception unit 202 outputs the extracted data, control signal, and the like to the control unit 204 or the memory unit 205.

The control unit 204 receives the control signal from the radio reception unit 202, extracts the scheduling information or the like allocated to the mobile station 200 from the control signal, and outputs the scheduling information or the like to the radio transmission unit 201 or the radio reception unit 202.

The control unit 204 generates a control signal or the like and outputs the control signal or the like to the radio transmission unit 201. The control signal may include, for example, HARQ ACK or HARQ NACK, channel state information (CSI), and a scheduling request (SR).

Further, the control unit 204 executes delivery confirmation (or response confirmation) and a retransmission process for TCP data. For example, the TCP data is exchanged between the mobile station 200 and a server that handles TCP via the base station 100. In this case, in principle, the base station 100 transmits a TCP packet transmitted from the server to the mobile station 200 or transmits a TCP packet transmitted from the mobile station 200 to the server without analyzing a TCP header or TCP data included in the TCP packet.

Even in retransmission of TCP, when a TCP reception side can correctly receive TCP data transmitted from a TCP transmission side, the TCP reception side responds to the TCP transmission side with TCP ACK (or a positive response). When the TCP ACK is received, the TCP transmission side starts transmitting subsequent TCP data. Conversely, when the TCP ACK is not received although a given time has passed after the transmission of the TCP data, the TCP transmission side retransmits the TCP data for which the TCP ACK is not confirmed to the reception side. In this case, for example, the TCP transmission side may determine that the TCP data may not correctly be received by the TCP reception side when receiving a plurality (for example, 3) of TCP ACKs (or repeated ACK) with the same confirmation response number, and may retransmit the TCP data. The retransmission process by TCP is executed by, for example, the control unit 204. In this case, the control unit 204 confirms whether the TCP data can correctly be received, generates delivery confirmation information of TCP according to a result, and transmits the delivery confirmation information to the server via the radio transmission unit 101. When the TCP ACK may not b received although a given time has passed after transmission of the TCP data to the server or the like via the radio transmission unit 101, the control unit 204 reads the TCP data for which the TCP ACK stored in the memory unit 205 may not be confirmed and transmits the TCP data to the server via the radio transmission unit 101.

TCP is included in the transport layer (Layer 4) of the OSI reference model. On the other hand, the MAC layer in which HARQ ACK or the like is handled is included in the data link layer (Layer 2) of the OSI reference model. The transport layer is an upper layer of the data link layer.

A radio link control (RLC) layer and a packet data convergence protocol (PDCP) layer in LTE or the like are included in the data link layer and are sublayers of the data link layer. For the MAC layer, an RCL layer, and the PDCP layer, the MAC layer is a lower layer and the PDCP layer is an upper layer in these layers.

For example, the control unit 204 can receive data of the MAC layer from the radio reception unit 202, can generate or extract data of each layer from data of the MAC layer to TCP data, and subsequently can execute a process on the TCP data. For example, the control unit 204 can transmit the data of the MAC layer to the base station 100 by generating or extracting the data of each layer from the TCP data to the data of the MAC layer and subsequently outputting the data of the MAC layer to the radio transmission unit 201.

Further, the control unit 204 executes retransmission control by HARQ. The retransmission control by HARQ is executed between the base station 100 and the mobile station 200. For example, the control unit 204 and the like execute the following process. That is, the radio reception unit 202 notifies the control unit 204 of a processing result indicating whether data can correctly be decoded when the decoding process is executed based on a CRC or the like added to the data of the MAC layer. The control unit 204 generates HARQ ACK or HARQ NACK according to the processing result. The control unit 204 transmits HARQ ACK or HARQ NACK to the base station 100 via the radio transmission unit 201. On the other hand, when HARQ ACK is received from the base station 100 via the radio reception unit 202, the control unit 204 starts transmitting subsequent data of the MAC layer. When HARQ NACK is received from the base station 100 or HARQ ACK is not received although a given time has passed after the transmission of the data of the MAC layer, the control unit 204 reads the data for which HARQ ACK is not confirmed from the memory unit 205 and retransmits the data to the base station 100.

The memory unit 205 stores, for example, the data, the control signal, and the like. For example, the radio reception unit 202 or the control unit 204 appropriately stores the data, the control signal, and the like in the memory unit 205. The radio transmission unit 201 or the control unit 204 appropriately reads the data, the control signal, and the like stored in the memory unit 205.

In the base station 100 or the mobile station 200, for example, information processed before modulation or after decoding is referred to as data or control information in some cases, and information processed after modulation or before decoding is referred to as a signal in some cases. Alternatively, for example, information handled in the transport layer is also referred to as data, control information, or the like in some cases and information handled in the MAC layer is referred to as a signal in some cases.

<Example of Operation>

Next, an example of an operation will be described. First, a transmission example of TCP ACK in the mobile station 200 will be described. Next, an example of an operation in the second embodiment will be described with reference to the flowchart and the like.

<Transmission Example of TCP ACK by Mobile Station>

Figure 5A:
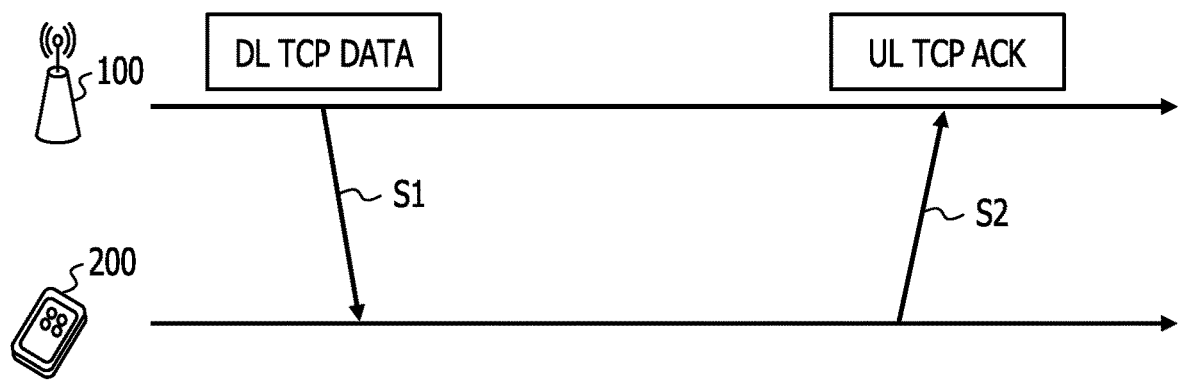
FIGS. 5A and 5B are diagrams illustrating transmission examples of TCP ACK.

FIGS. 5(A) to 6 are diagrams illustrating a transmission example of TCP ACK. As illustrated in FIG. 5A, when the mobile station 200 normally receives TCP data transmitted in the downward direction ("DL TCP data") (S1), the mobile station 200 generates TCP ACK and transmits the generated TCP ACK ("UL TCP ACK") in the upward direction (S2). As described above, the TCP data is generated by, for example, a server or the like connected to the base station 100 and is transmitted to the mobile station 200 via the base station 100. TCP ACK is also transmitted toward the server generating the TCP data via the base station 100.

Figure 5B:
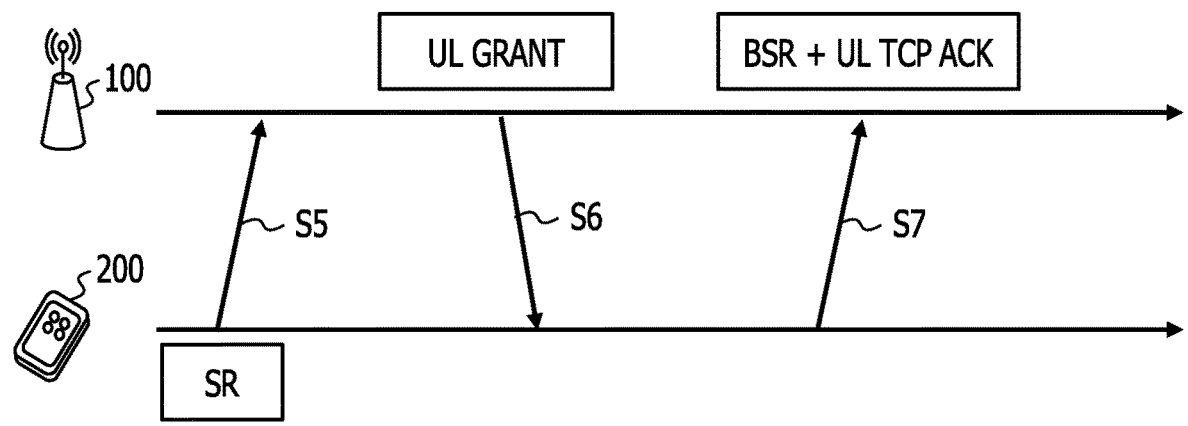

In this case, the mobile station 200 executes, for example, a scheduling request procedure illustrated in FIG. 5B to transmit TCP ACK.

That is, the mobile station 200 transmits the scheduling request (SR) to the base station 100 using the PUCCH (S5). The base station 100 receives the scheduling request and generates the scheduling information. The base station 100 transmits a UL grant (or transmission permission) including the scheduling information to the mobile station 200 using the PDCCH (S6). The mobile station 200 transmits TCP ACK to the mobile station 200 using the radio resources of the PUSCH allocated with the scheduling information (S7). The example of FIG. 5B is an example in which the mobile station 200 transmits TCP ACK and a buffer status report (BSR) to the base station 100.

Figures 6A, 6B:
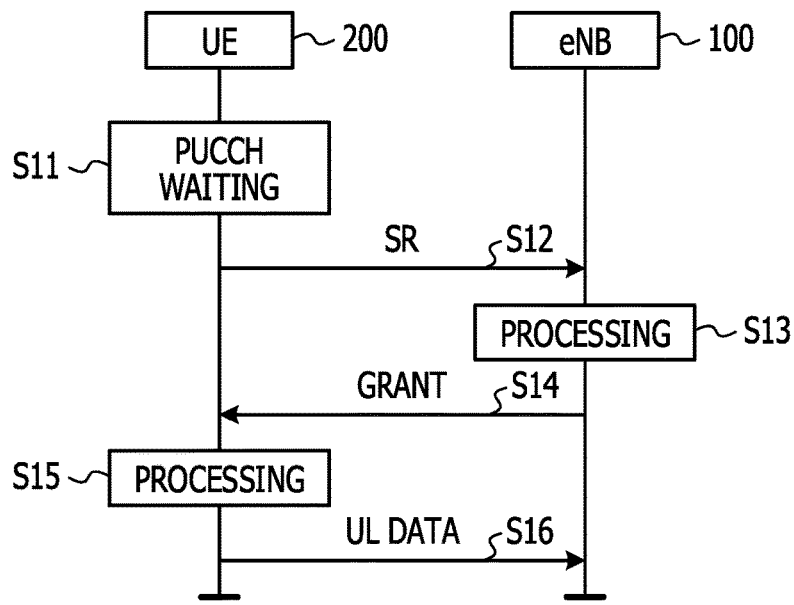
FIG. 6A is a diagram illustrating a sequence example of an SR procedure and FIG. 6B is a diagram illustrating a detailed example of a delay time.

FIG. 6A illustrates a sequence example of a series of processes until the mobile station 200 can transmit data in the upward direction and FIG. 6B illustrates an example of a time taken for the mobile station 200 to transmit data in the upward direction.

For example, when data occurs, the mobile station (user equipment (UE)) 200 waits for an opportunity to transmit the PUCCH (S11) and transmits the scheduling request using the PUCCH (S12). The base station (evolved node B (eNB)) 100 executes a process of allocating radio resources or the like (S13) and transmits a UL grant (S14). The mobile station 200 receives the UL grant, executes a process on the data, such as an encoding process (S15), and transmits the data ("UL data") using the radio resources included in the PUSCH (S16). An example of the UL data includes TCP ACK.

FIG. 6B illustrates an example of an elapsed time in each process of S11 to S16 in the sequence of the series of the processes. For example, an average delay time in the process of S11 is "2.5 ms" or the like. As illustrated in FIG. 6B, a delay time until one mobile station 200 transmits the data in the upward direction is assumed to be about "11.5 ms" despite being error-free. That is, a delay time taken to transmit TCP ACK is assumed to be about "11.5 ms". The delay time has a considerable influence on TCP communication and is one factor which deteriorates throughput in TCP. As a simply reference example, for example, a round-trip time (RTT) on an Internet circuit from Tokyo to Osaka was about 20 ms. The magnitude of "11.5 ms" can also be understood from the reference value.

Accordingly, in the second embodiment, the mobile station 200 transmits TCP ACK using the PUCCH. Thus, the scheduling request procedure illustrated in FIG. 5B or 6 is omitted, and thus it is possible to short the delay time taken to transmit TCP ACK. By shorting the delay time of TCP ACK, it is also possible to improve throughput in TCP.

Figure 7:
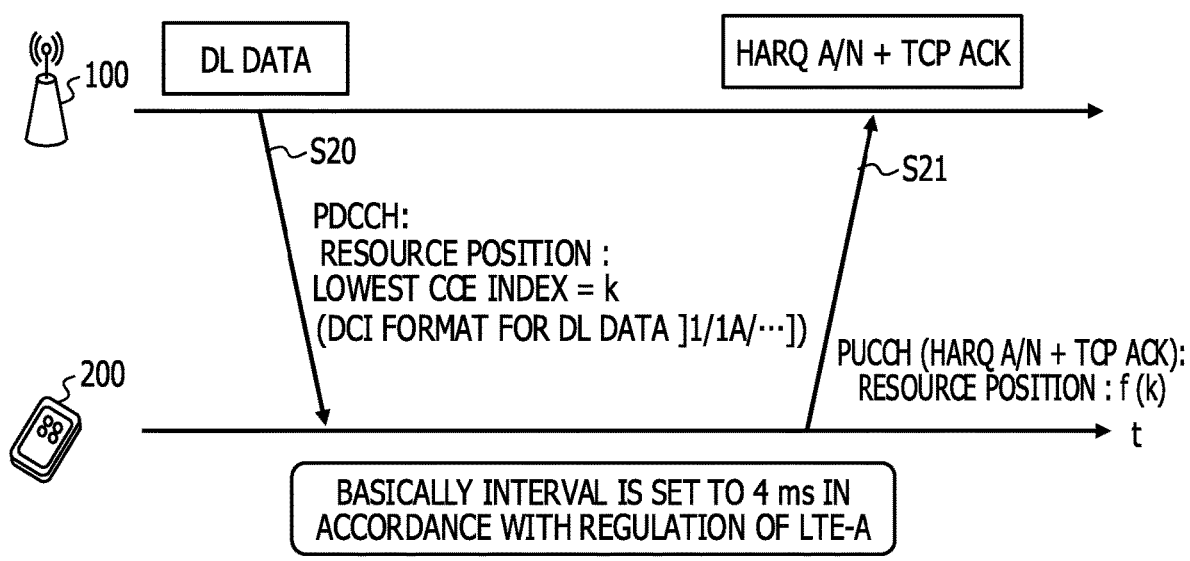
FIG. 7 is a diagram illustrating a transmission example of the TCP ACK.

FIG. 7 is a diagram illustrating an example in which the mobile station 200 transmits TCP ACK using the PUCCH. The base station 100 transmits downward data ("DL data") using the PDSCH (S20). In this case, the mobile station 200 determines (or selects) the position of the radio resource in the PUCCH with which TCP ACK is transmitted, based on the first CCE index (lowest CCE index) (or a number) among control channel elements (CCEs) included in the PDCCH.

The CCE is, for example, a unit (or component) of a radio resource used to transmit the PDCCH. The base station 100 allocates, for example, 1, 2, 4, or 8 continuous CCEs for each mobile station 200. The base station 100 transmits a control signal or the like destined for the mobile station 200 using the allocated CCEs. The number of CCEs is equivalent to an aggregation level. For example, when the number of CCEs is 8, the aggregation level is 8. The base station 100 can determine the number of CCEs so that the encoding rate decreases as the number of CCEs included in one PDCCH increases. The base station 100 may determine the number of CCEs allocated to one base station 200 based on radio quality.

Figure 8:
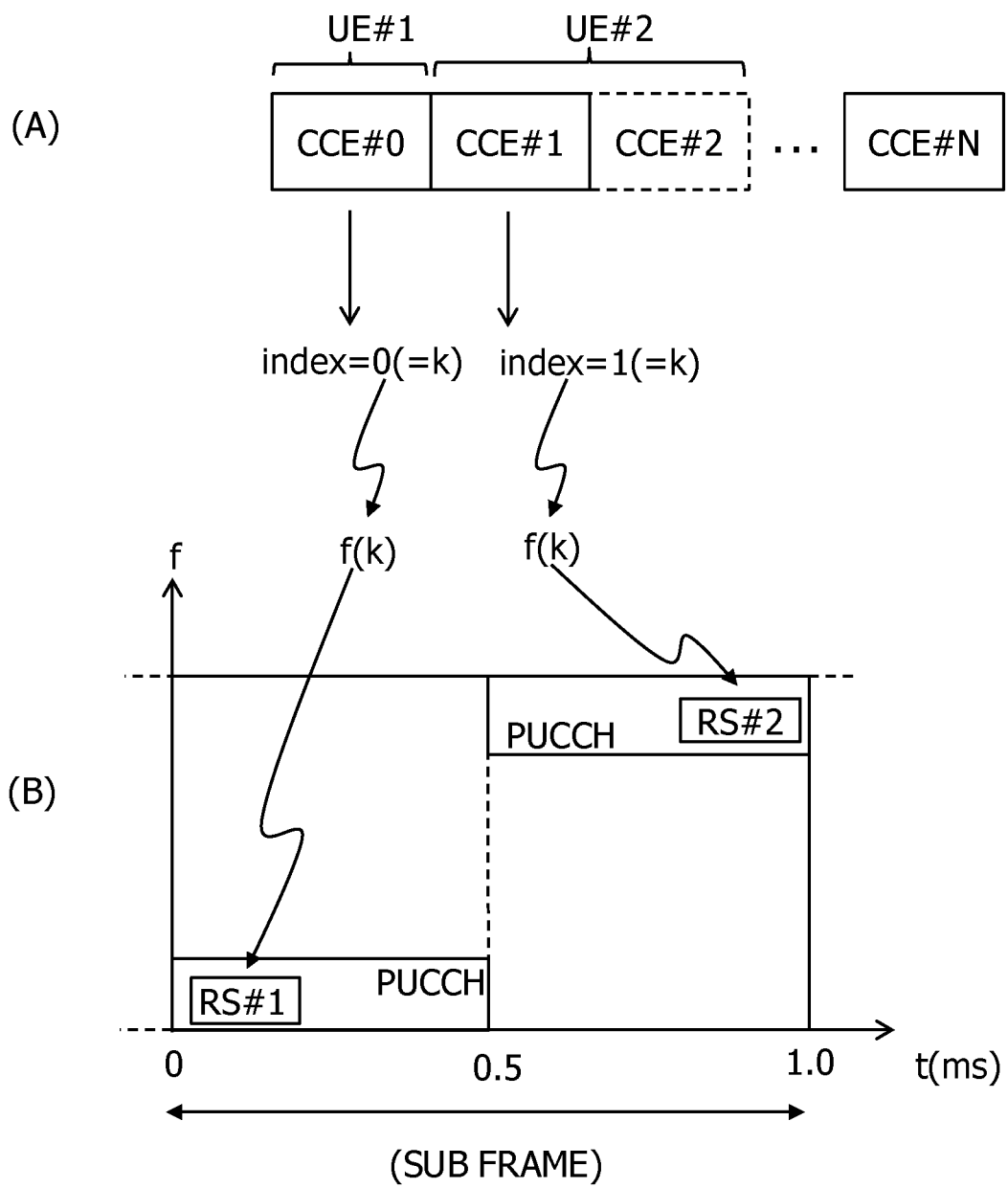
FIG. 8 includes a section (A) which is a diagram illustrating an allocation example of CCE to the mobile station device and a part (B) which is a diagram illustrating an allocation example of the TCP ACK to a PUCCH.

FIG. 8(A), which is section (A) of FIG. 8, illustrates an example of the CCEs allocated to each mobile station 200 by the base station 100. In the example of FIG. 8(A), the base station 100 allocates CCE (CCE #0) with a CCE index of "0" to a mobile station 200-1 (UE #1). The base station 100 allocates to two CCEs (CCE #1 and CCE #2) with CCE indexes of "1" and "2" to the mobile station 200-2 (UE #2). For example, the base station 100 allocates the CCE indexes to a plurality of users (or the mobile stations 200) multiplexed in the same subframe so that the same CCE index is repeated. The mobile station 200 executes, for example, a decoding process or the like on all CCEs (or CCEs within a given candidate range) to detect CCEs which can correctly be decoded as CCEs which can be allocated to the mobile station. In this case, the mobile station 200 can also specify the CCE indexes according to the number of CCEs which can correctly be decoded. For example, when the number of CCEs which can correctly be decoded is 1, the CCE is CCE #0. When the number of CCEs which can correctly be decoded is 2, the CCEs are CCE #1 and CCE #2). This detection is referred to as, for example, blind detection (or blind decoding) in some cases.

The mobile station 200 determines the resource position of the PUCCH used to transmit TCP ACK using the first CCE index k among the CCE indexes detected through the blind detection in this way. For example, as illustrated in FIG. 8(B) (i.e. section (B) of FIG. 8), when the first CCE index k for the mobile station 200-1 is "0", the position of RS #1 in the PUCCH is determined as a radio resource used to transmit TCP ACK by f(0). When the first CCE index k for the mobile station 200-2 is "1", RS #2 in the PUCCH is determined as a radio resource used to transmit TCP ACK by f(1). The function f may be determined as a system or may be determined for each of the mobile stations 200-1 and 200-2.

Referring back to FIG. 7, the mobile station 200 transmits TCP ACK using the radio resource at the position determined by f(k) (S21). In FIG. 7, the mobile station 200 transmits HARQ ACK or HARQ NACK along with TCP ACK using the radio resource f(k) of the PUCCH.

Figure 9:
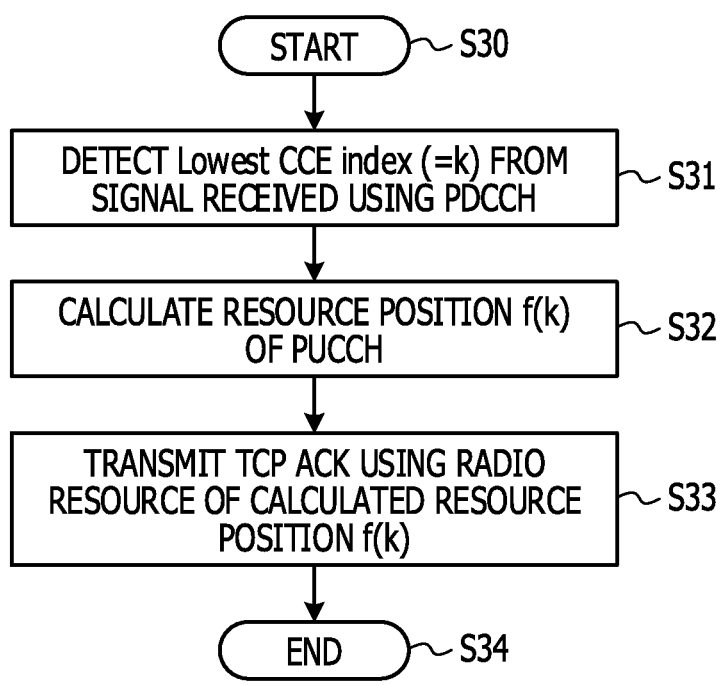
FIG. 9 is a flowchart illustrating an operation example.

FIG. 9 is a flowchart illustrating an example of an operation in the mobile station 200. In FIG. 9, the example of the operation described above is collected.

When the mobile station 200 starts a process (S30), the mobile station 200 detects the smallest CCE index k among the CCE indexes allocated to the mobile stations 200 from the signal received using the PDCCH (S31). For example, the radio reception unit 202 detects the smallest CCE index k through the blind detection on the decoded signal transmitted using the PDCCH and outputs the detected CCE index k to the control unit 204.

Subsequently, the mobile station 200 calculates the resource position g=f(k) in the PUCCH based on the detected smallest CCE index k (S32). For example, the control unit 204 calculates the resource position f(k) by reading an expression indicating the function f stored in the memory unit 205 and substituting the smallest CCE index k to the function f received from the radio reception unit 202.

Subsequently, the mobile station 200 transmits TCP ACK using the radio resource of the calculated resource position f(k) of the PUCCH (S33). For example, the following process is performed. That is, the control unit 204 outputs the resource position f(k) to the radio transmission unit 201. The control unit 204 generates TCP ACK and outputs the data of the MAC layer corresponding to the generated TCP ACK to the radio transmission unit 201. The radio transmission unit 201 executes the encoding process, the modulation process, and the like on the data to convert the data into the radio signal and transmits the radio signal to the base station 100 using the radio resource at the resource position f(k) of the PUCCH. Thus, TCP ACK is transmitted to the base station 100 using the PUCCH. In this case, the mobile station 200 may transmit the delivery confirmation information by HARQ (HARQ ACK or HARQ NACK) along with TCP ACK using the radio resource of the PUCCH.

<Method of Transmitting TCP ACK Using PUCCH>

Next, an example of a method in which the mobile station 200 transmits TCP ACK using the PUCCH will be described.

A data amount of one TCP ACK is at least 40 bytes (a TCP header of 20 bytes+an IP header of 20 bytes) and becomes, for example, 60 bytes from 50 bytes when a time stamp or the like is inserted into a TCP header. On the other hand, in a PUCCH format (PUCCH format), a data amount of 48 bits per subframe can be transmitted with PUCCH format 3. When TCP ACK is compressed, TCP ACK can be reduced less than 40 bytes. However, for example, when a known PUCCH format from PUCCH format 1 to PUCCH format 3 is used, TCP ACK may not be transmitted at a time.

Accordingly, in the second embodiment, TCP ACK is transmitted in accordance with the following two methods.

In a first method, the mobile station 200 transmits TCP ACK using a PUCCH format which can correspond to 32 component carrier (CC) support. In the PUCCH format, in a frequency division duplex (FDD) scheme, HARQ ACK or NACK of 64 bits (1-bit HARQ ACK or NACK*2 transport blocks (TBs)*32 CC) per subframe and CRC of 8 bits can be transmitted. In the PUCCH format, in a time division duplex (TDD) scheme, HARQ ACK or NACK of 128 bits per subframe and CRC of 8 bits can be transmitted. In this way, the PUCCH format which can correspond to the 32 CC support can transmit the number of bits greater than a known PUCCH format (for example PUCCH format 3). Accordingly, the mobile station 200 can transmit TCP ACK using the PUCCH format which can correspond to the 32 CC support.

In a second method, a new PUCCH with which the number of bits greater than the known PUCCH format (for example, PUCCH format 3) can be transmitted is defined and the mobile station 200 transmits TCP ACK using the new PUCCH. For example, the new PUCCH may be defined separately by a standardization organization or the like that defines a communication standard such as 3GPP.

For example, the information regarding the PUCCH is stored in the memory unit 205 of the mobile station 200. Then, the control unit 204 reads the information from the memory unit 205 and outputs the information to the radio transmission unit 201, and instructs the radio transmission unit 201 to transmit the information using the above-described PUCCH. The radio transmission unit 201 transmits the TCP ACK using the PUCCH or the new PUCCH which can correspond to the above-described 32 CC support according to the instruction. Thus, for example, as illustrated in FIG. 7, the mobile station 200 can transmit TCP ACK using the above-described PUCCH.

<Determination of TCP ACK and Another TCP Data by Mobile Station>

The mobile station 200 can transmit TCP ACK using the PUCCH and transmit another data such as the voice over Internet protocol (VoIP) using the PUSCH. On the other hand, the mobile station 200 executes a process such as an encoding process or a modulation process without distinguishing TCP ACK and the other data in the MAC layer or the physical layer (or the physical layer (PHY) layer) with the lowest level in the OSI reference model.

Accordingly, the mobile station 200 determines (or distinguishes) TCP ACK and the other data other than TCP ACK using the TCP header. Thus, for example, the mobile station 200 can allocate TCP ACK to the PUCCH and allocate the other data to the PUSCH to transmit TCP ACK and the other data.

Figure 10:
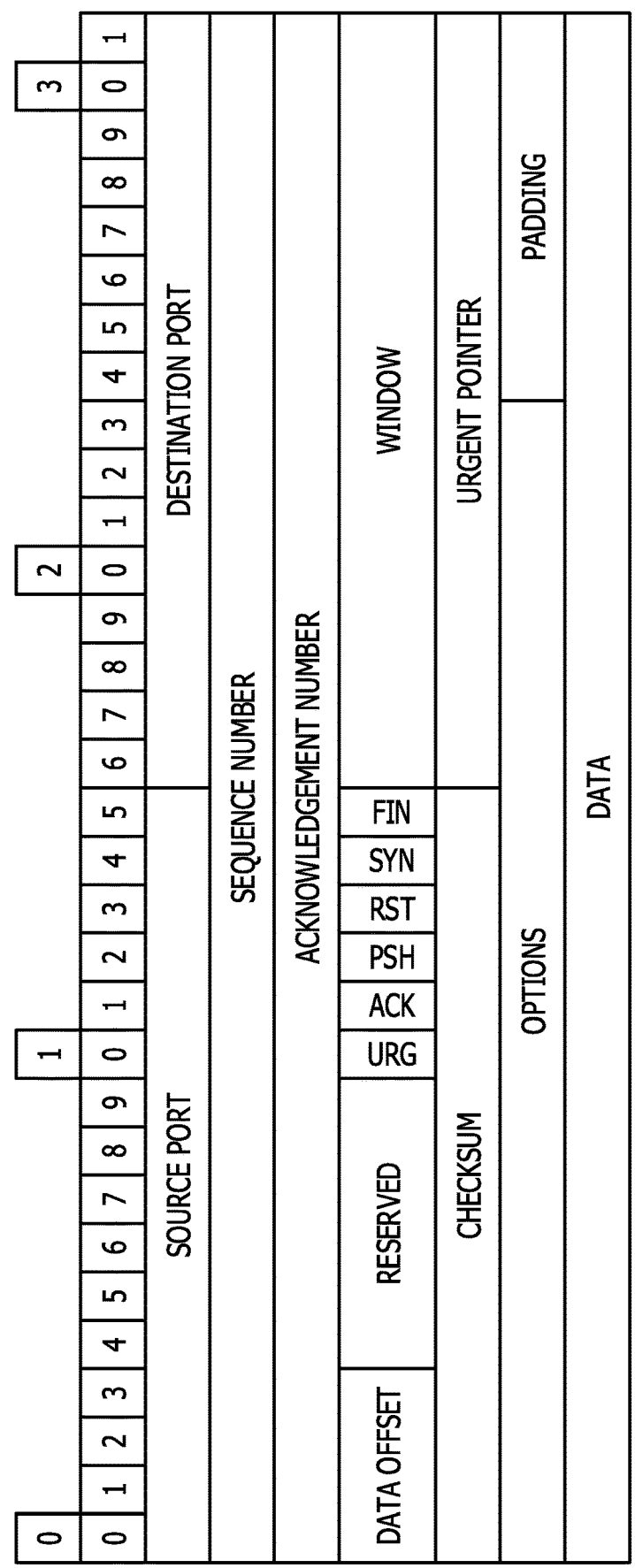
FIG. 10 is a diagram illustrating a configuration example of a TCP header.

FIG. 10 is a diagram illustrating a configuration example of the TCP header. In the TCP header, there is an "Acknowledgement Number" region. For normal TCP data, a number is not inserted into the "Acknowledgement Number" region. The mobile station 200 inserts a number into the "Acknowledgement Number" region of the TCP header at the time of TCP ACK and does not insert a number into the "Acknowledgement Number" region at the time of the other data.

For example, the mobile station 200 executes the following process. That is, when TCP data of the transport layer is processed, the control unit 204 of the mobile station 200 inserts a number into the "Acknowledgement Number" region of the TCP header at the time of transmitting TCP ACK. On the other hand, the control unit 204 does not insert any number into the "Acknowledgement Number" region at the time of transmitting the other data. When data of the MAC layer is processed, the control unit 204 analyzes the "Acknowledgement Number" region of the TCP header. When a number is inserted, the control unit 204 confirms that the TCP packet is TCP ACK. When a number is not inserted, the control unit 204 confirms that the TCP packet is the other data. When the control unit 204 confirms that the TCP packet is TCP ACK, the control unit 204 instructs the radio transmission unit 201 to transmit TCP ACK using the PUCCH and to transmit the other data using the PUSCH. The radio transmission unit 201 transmits TCP ACK using the PUCCH and transmits the other TCP data using the PUSCH in accordance with the instruction. In the analysis, it may also be confirmed whether the ACK field of the TCP header rises.

The control unit 204 may insert information indicating TCP ACK into a region other than the "Acknowledgement Number" region of the TCP header, for example, an "Options" region. Thus, TCP data different from TCP ACK can also be identified. Alternatively, the control unit 204 may insert information by which TCP ACK and the other data can be distinguished into, for example, a region (for example, a first region) in which there is the TCP header. Alternatively, the control unit 204 may analyze a data amount of the TCP data inserted into the TCP data region. When the data amount is a value (for example, 40 bytes) indicating a data amount of TCP ACK, TCP ACK may be distinguished. When the data amount is not the value, the other TCP data may be distinguished.

<Transmission Interval of TCP ACK>

The mobile station 200 receives the control signal or the like using the PDCCH and subsequently transmits a signal using the PUCCH after 4 subframes (4 ms). In the mobile station 200, there is a possibility that generation of TCP ACK is delayed in a section (4 ms) until the signal is transmitted with the PUCCH after the signal is received with the PDCCH.

Figure 11A:
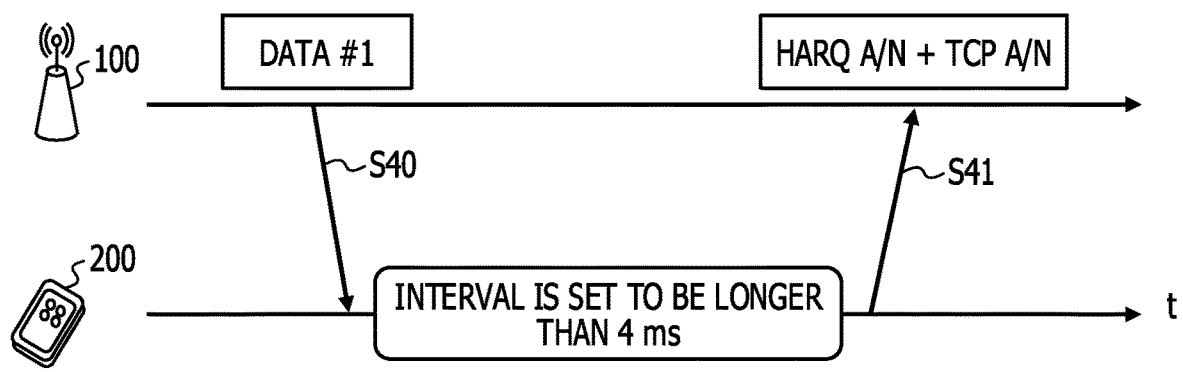
FIGS. 11A and 11B are diagrams illustrating transmission examples of the TCP ACK.

Accordingly, the mobile station 200 sets a value longer than 4 ms in a section from reception of a signal with the PDCCH to transmission of a signal with the PUCCH. As illustrated in FIG. 11A, the mobile station 200 receives the signal with the PDCCH (S40) and subsequently transmits TCP ACK when a set section has passed (S41).

Figure 11B:
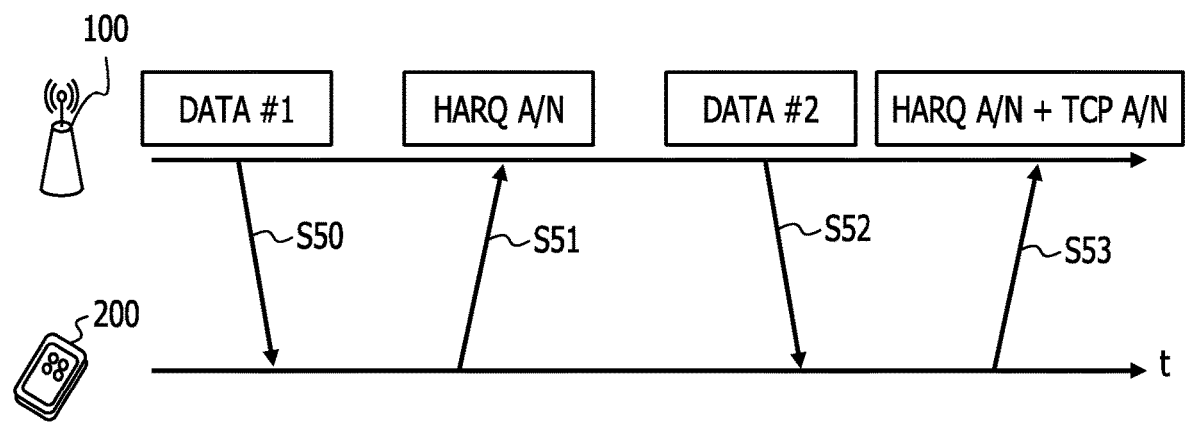

As illustrated in FIG. 11B, the mobile station 200 does not transmit TCP ACK after 4 ms has passed (S50 and S51) and may transmit TCP ACK using a subsequent transmission opportunity (S52 and S53).

<Countermeasures Against ACK/NACK Error (or NACK/ACK Error) by HARQ>

When retransmission control by HARQ is executed, an ACK/NACK error (or NACK/ACK error: hereinafter referred to as an "ACK/NACK error" in some cases) occurs in some cases. For example, irrespective of the fact that the mobile station 200 transmits HARQ ACK, the base station 100 receives NACK. Alternatively, irrespective of the fact that the mobile station 200 transmits HARQ NACK, the base station 100 receives ACK in some cases. It is considered that this is because bit inversion, phase inversion, or the like occurs since various kinds of noise, errors, or the like occur in a transmission path, a processing circuit, or the like.

Accordingly, the mobile station 200 transmits two pieces of information, the delivery confirmation information by HARQ and the delivery confirmation information by TCP, using the same PUCCH. Thus, even when an ACK/NACK error occurs, recovery is possible and radio communication between the mobile station 200 and the base station 100 is possible.

FIG. 12 illustrates all the patterns in a table format. There are all four patterns form pattern "1" to pattern "4". Table of FIG. 12 indicates transmission of the base station 100 ("DL TCP data"), reception of the mobile station 200 ("reception of mobile station"), transmission of the delivery confirmation information of the mobile station 200 ("Air (PUCCH)"), and reception of the base station 100 ("reception of base station") in order from the left. The right end ("ARQ") of FIG. 12 indicates whether retransmission in the RLC layer is executed. When the base station 100 confirms that TCP ACK can be correctly received in the RLC layer, The base station 100 can confirm end-to-end transmission of TCP ACK. Conversely, when the base station 100 may not correctly confirm TCP ACK in the RLC layer, the base station 100 executes retransmission control (automatic repeat request (ARQ)). Hereinafter, the description will be described in order from pattern "1".

In pattern "1", the base station 100 transmits TCP data with a sequence number (SN) N ("SN=N: Tx").

When the mobile station 200 receives the TCP data and correctly receives the TCP data in the MAC layer, the mobile station 200 generates HARQ ACK ("OK"). When the mobile station 200 correctly receives the TCP data in the transport layer, the mobile station 200 generates TCP ACK in which the sequence number "N" is inserted into the "Acknowledgement Number" of the TCP header. The mobile station 200 transmits HARQ ACK and TCP ACK ("ACK" and "SN=N").

The base station 100 confirms that HARQ ACK is normally received ("OK") and confirms that TCP ACK is also correctly received in the RLC layer ("OK").

In pattern "2", the mobile station 200 transmits HARQ ACK and TCP ACK as in pattern "1", but the base station 100 receives HARQ NACK ("NACK"). This is a case in which an ACK/NACK error occurs. In this case, retransmission is executed. As illustrated in the subsequent row of pattern "2" of FIG. 12, the base station 100 executes retransmission by HARQ ("HARQ Re"). In this case, the mobile station 200 normally receives retransmitted data ("OK") and subsequently confirms that TCP ACK is normally received in the RLC layer as in pattern "1" ("OK").

In pattern "3", the base station 100 transmits the TCP data ("SN=N: Tx") and the mobile station 200 detects an error in the received data of the MAC layer ("Error"). In this case, the mobile station 200 transmits HARQ NACK. The base station 100 receives HARQ NACK and executes retransmission by HARQ ("HARQ Re"). Subsequently, the retransmitted data is normally received by the mobile station 200

("OK"). The mobile station 200 transmits TCP ACK ("ACK") and also confirms normal reception in the RLC layer ("OK").

In pattern "4", the base station 100 transmits TCP data ("SN=N: Tx") and the mobile station 200 detects an error ("Error"). In this case, the mobile station 200 transmits HARQ NACK ("NACK"), but the base station 100 receives ACK by the NACK/ACK error ("ACK"). In this case, the data received by the base station 100 contains an error, noise, or the like and an error, nose, or the like is contained in the RLC layer. Accordingly, the base station 100 detects an error in the RLC layer ("Error"). In this case, retransmission by ARQ in the RLC layer is executed ("ARQ Re"). Through the retransmission by ARQ, the mobile station 200 can transmit TCP ACK and the base station 100 can confirm normal reception in the RLC layer.

<Conclusion of Second Embodiment>

As described above, in the second embodiment, the mobile station 200 can transmit TCP ACK using the PUCCH without executing the scheduling request procedure (for example, S11 to S16 of FIG. 6). Accordingly, it is possible to also shorten a delay time (in the example of FIG. 6B, "11.5 ms") from occurrence of the TCP data to transmission of TCP ACK. The delay time of TCP ACK can be shortened up to about "5 ms". The throughput of TCP increases in reverse proportion to a decrease in RTT and the effect of increasing the throughput of TCP in accordance with this scheme is twice or more than when the scheduling request procedure is executed (for example, FIG. 6A).

<Nagle-Delay ACK Problem and Solutions Thereto>

Next, a Nagle-delay ACK problem and solutions thereto will be described. FIGS. 13 to 16(B) are diagrams illustrating the problem and solutions thereto. First, delay ACK will be described.

Figure 13:
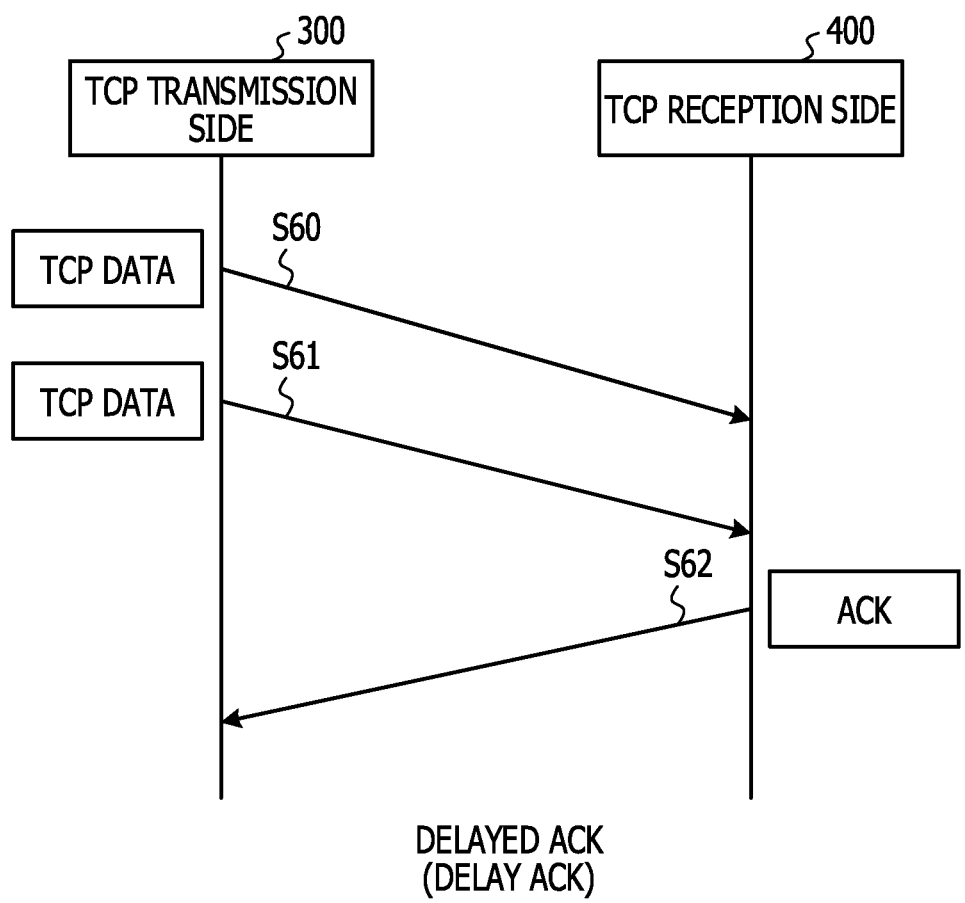
FIG. 13 is a diagram illustrating a delay ACK.

FIG. 13 is a diagram illustrating the delay ACK. As illustrated in FIG. 13, a TCP reception side 400 responds with TCP ACK when the TCP reception side 400 can normally receive TCP data transmitted from a TCP transmission side 300. In this case, when the TCP reception side 400 receives TCP data with a largest segment size or more, the TCP reception side 400 receives two segments of the TCP data (S60 and S61) and recommends transmitting TCP ACK (or executes mounting for the transmission) (S62). Since the TCP reception side 400 receives the TCP data of the two segments and transmits TCP ACK, there is the advantage of enabling an opportunity to update a TCP reception window to be given.

Figure 14:
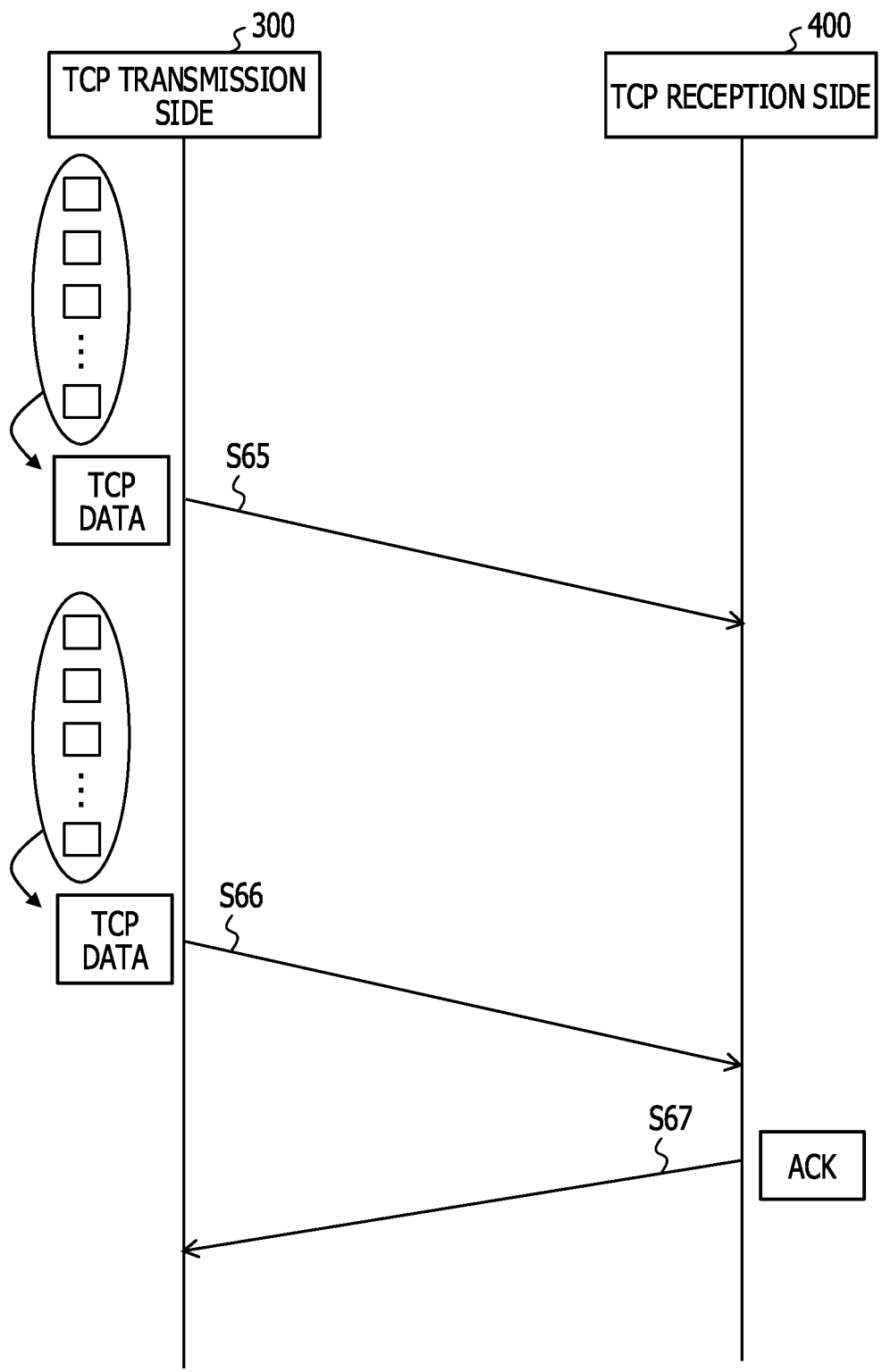
FIG. 14 is a diagram illustrating an example of a solution for the Nagle-delay ACK problem.

FIG. 14 is a diagram illustrating the Nagle-delay ACK problem. For example, when there are many small pieces of TCP data, the TCP transmission side 300 does not the small pieces of TCP data one by one but collectively transmit the plurality of small pieces of TCP data as one piece of TCP data (S65 and S66). In this way, an algorithm for collectively transmitting the plurality of pieces of data as one piece of data is referred to as, for example, a Nagle algorithm in some cases. In this case, it takes a time equal to or greater than a given time until the TCP transmission side 300 collectively transmits the TCP data as one piece of data (S65 and S66). Then, as described in the delay ACK, in order to the TCP reception side 400 to receive the TCP data of two segments and transmit TCP ACK, it takes a considerably long time equal to or greater than a threshold until the TCP transmission side 300 receives TCP ACK in some cases. In this way, the problem that it takes a considerably long time in order for the TCP transmission side 300 to receive TCP ACK is referred to as, for example, a Nagle-delay ACK problem in some cases.

In the second embodiment, two solutions to the Nagle-delay ACK problem will be described.

Figure 15:
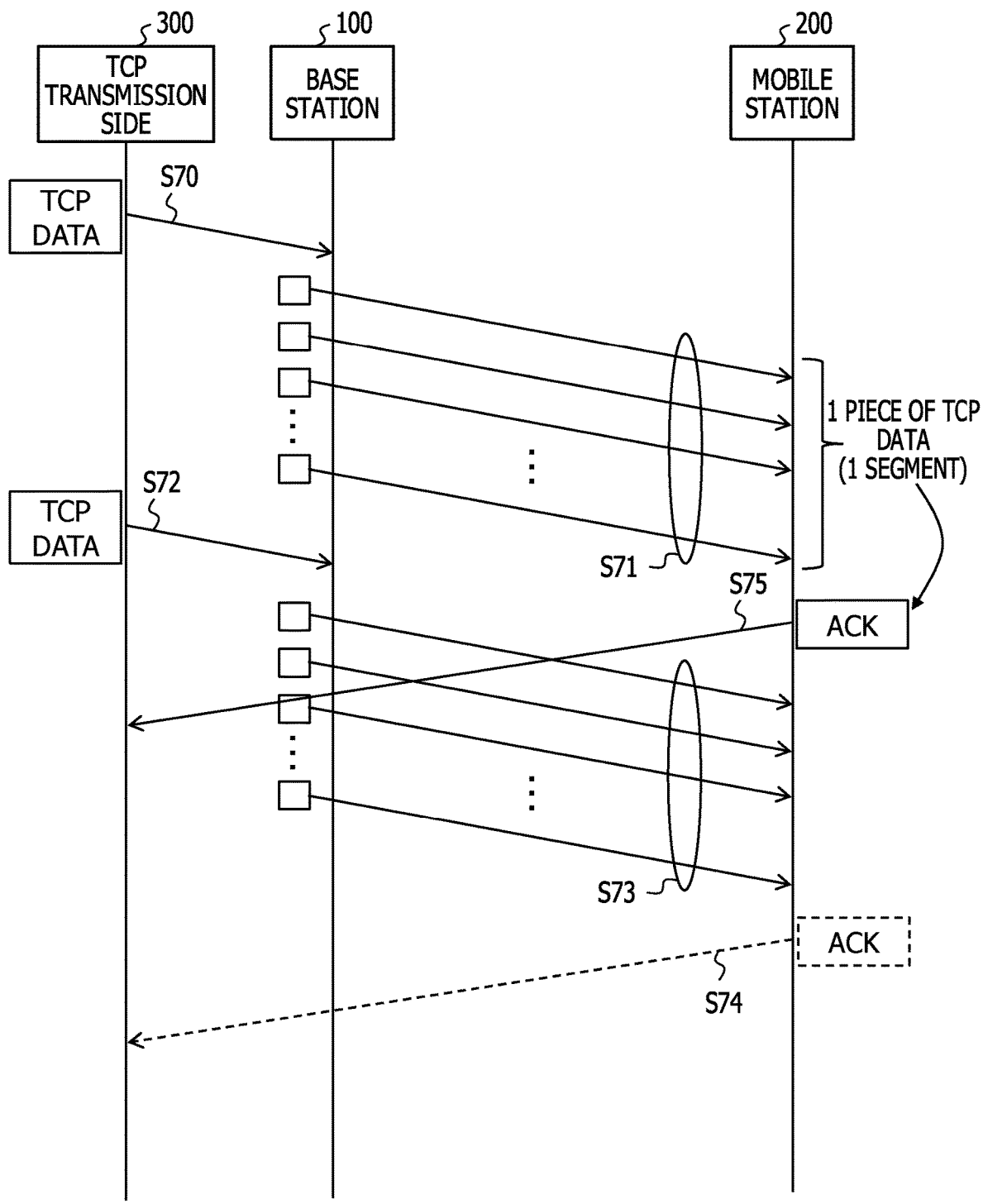
FIG. 15 is a diagram illustrating an example of the solution for the Nagle-delay ACK problem.

FIG. 15 is a diagram illustrating a first example of the solutions. In FIG. 15, the mobile station 200 is exemplified as the TCP reception side 400. When the TCP data of one segment is received from the TCP transmission side 300 (S70), the base station 100 segments the TCP data into a plurality of pieces of data to transmit the TCP data to the mobile station 200 (S71).

When the plurality of segmented pieces of data are received, the mobile station 200 stops the delay ACK. When the TCP data of one segment is received, the mobile station 200 responds with TCP ACK (S75). Thus, for example, in the TCP transmission side 300, transmission delay of TCP ACK can be shortened compared to when the mobile station 200 receives two segments and responds with TCP ACK (S74).

Figure 16A:
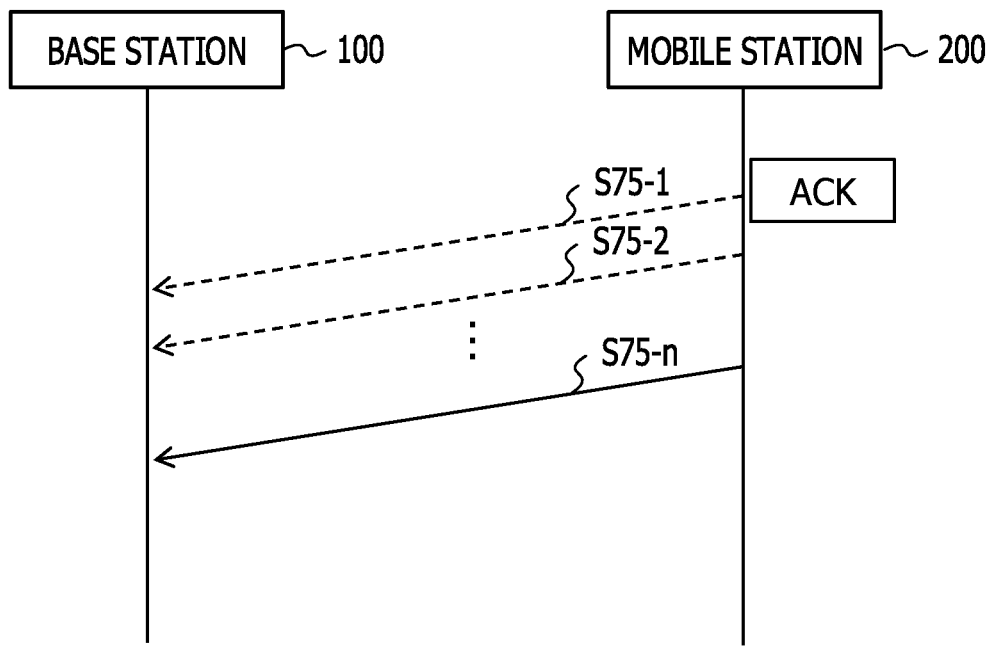
FIGS. 16A and 16B are diagrams illustrating an example of the solution for the Nagle-delay ACK problem.
Figure 16B:
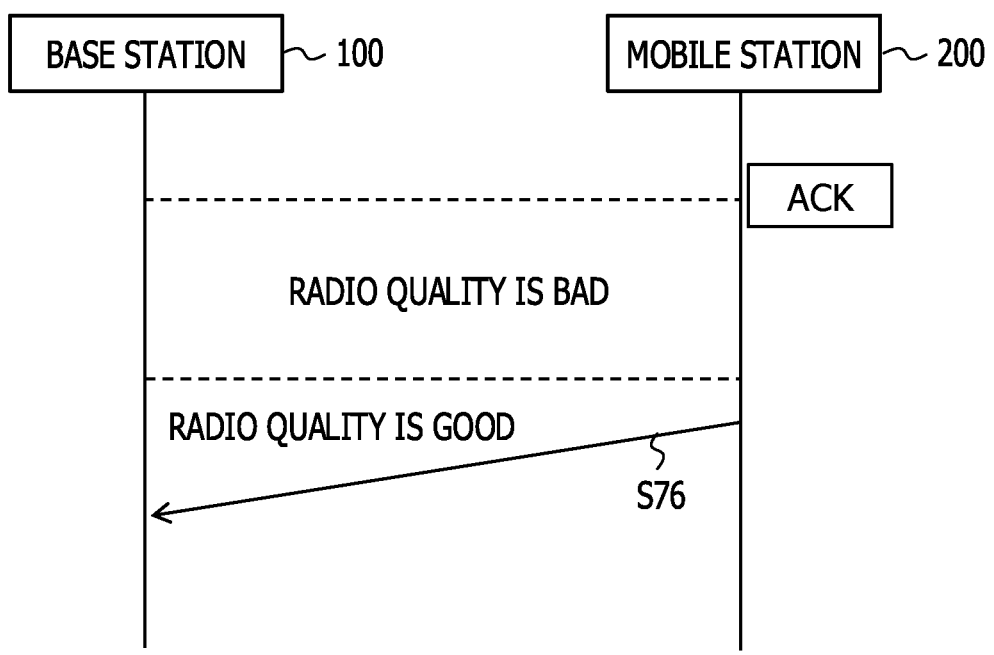

FIGS. 16(A) and 16(B) are diagrams illustrating a second example of the solutions. The second example is an example in which the mobile station 200 transmits TCP ACK when radio quality is good. For example, when the mobile station 200 transmits TCP ACK and quality of an upward radio line is not good, TCP ACK is transmitted repeatedly several times in some cases (S75-1, S75-2, . . . , S75-*n* of FIG. 16A). In this case, in the base station 100 or the TCP transmission side 300, transmission delay of TCP ACK occurs.

Accordingly, when the radio quality is equal to or less than given quality, the mobile station 200 does not transmit TCP ACK. When the radio quality is higher than the given quality, the mobile station 200 collectively transmits TCP ACK (S76 of FIG. 16B). In the mobile station 200, TCP ACK is not transmitted several times and it is possible to achieve a reduction in power consumption of the mobile station 200.

Other Embodiments

Figure 17:
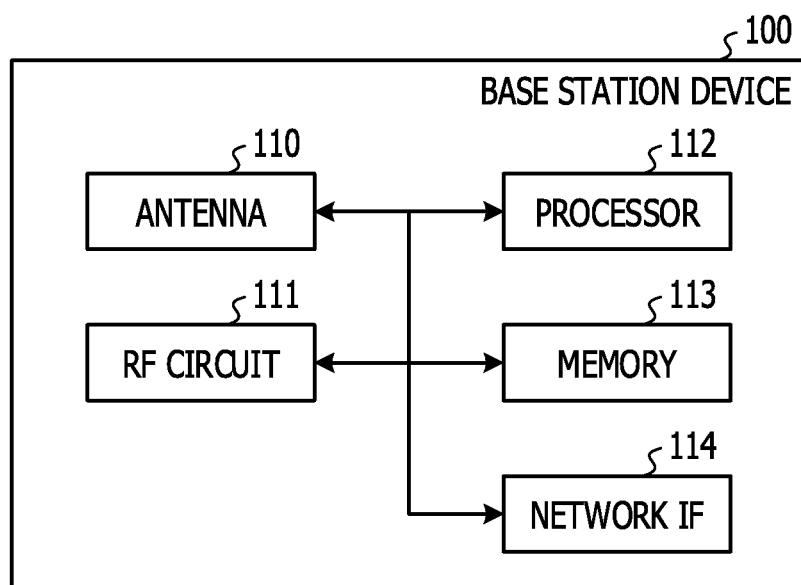
FIG. 17 is a diagram illustrating a hardware configuration example of a base station device.

FIG. 17 is a diagram illustrating a hardware configuration example of the base station 100. The base station 100 includes an antenna 110, a radio frequency (RF) circuit 111, a processor 112, a memory 113, a network interface (IF) 114. The processor 112 can realize the function of the control unit 104 by reading and executing a program stored in the memory 113. The processor 112 corresponds to, for example, the control unit 104 in the second embodiment. The antenna 110 and the RF circuit 111 correspond to, for example, the radio transmission unit 101 and the radio reception unit 102 in the second embodiment. Further, the memory 113 corresponds to, for example, the memory unit 105 in the second embodiment. Furthermore, the network IF 114 corresponds to, for example, the network communication unit 106 in the second embodiment.

Figure 18:
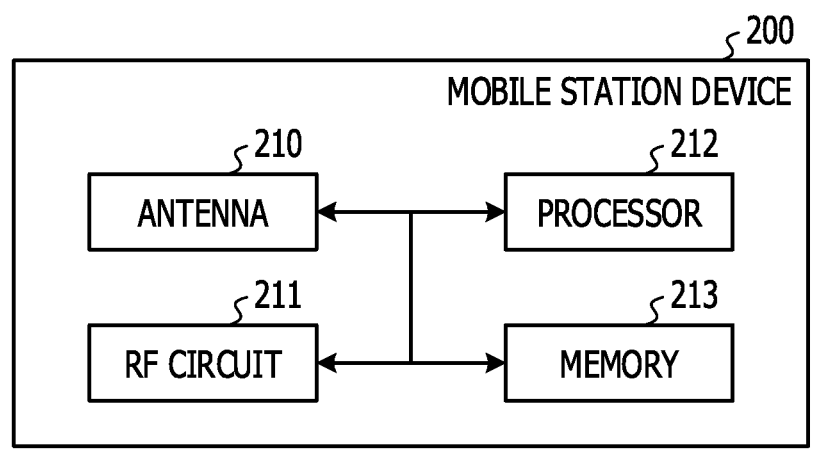
FIG. 18 is a diagram illustrating a hardware configuration example of a mobile station device.

FIG. 18 is a diagram illustrating a hardware configuration example of the mobile station 200. The mobile station 200 includes an antenna 210, an RF circuit 211, a processor 212, and a memory 213. The processor 212 can realize the function of the control unit 204 by reading and executing a program stored in the memory 213. The processor 212 corresponds to, for example, the control unit 204 in the second embodiment. The antenna 210 and the RF circuit 211 correspond to, for example, the radio transmission unit 201 and the radio reception unit 202 in the second embodiment. Further, the memory 213 corresponds to, for example, the memory unit 205 in the second embodiment.

The processors 112 and 212 may be, for example, a central processing unit (CPU), a micro processing unit (MPU), or a field programmable gate array (FPGA).

In the above-described example, the example in which the mobile station 200 determines the resource position of the PUCCH used to transmit TCP ACK based on the smallest CCE index k among CCEs allocated to the mobile station 200 has been described (for example, FIG. 8(B)). For example, the mobile station 200 may determine the resource position of the PUCCH used to transmit TCP ACK based on the largest CCE index among CCEs allocated to the mobile station 200. For example, the mobile station 200 may transmit TCP ACK using the radio resource of the PUCCH corresponding to the CCE index of CCE allocated to the mobile station 200.

In the above-described example, TCP has been described as an example. For example, as long as a protocol such as the stream control transmission protocol (SCTP) that transmits and receives the delivery confirmation information in a end-to-end scheme and ensures reliability of communication can be used, the above-described example can be realized. Even in this case, by realizing the above-described example, it is possible to shorten the delay time taken to transmit the delivery confirmation information in accordance with the protocol and achieve an improvement in throughput of communication using the protocol.

Further, in the above-described example, the example in which TCP ACK is mainly transmitted has been described. For example, even when the mobile station 200 transmits TCP ACK, it is possible to transmit TCP NACK as in the case in which TCP ACK is transmitted.

Furthermore, in the above-described example, the example of the upward direction in which the mobile station 200 transmits TCP ACK to the base station 100 using the PUCCH has been described. For example, even in the downward direction in which TCP ACK is transmitted to the mobile station 200 using the PDCCH, the base station 100 can execute the above-described example. In this case, the base station 100 can transmit the delivery confirmation information (TCP ACK or TCP NACK) of TCP for the TCP data transmitted from the mobile station 200 using the PDCCH.

Combination of Embodiments

The above-described embodiments can also be combined in any manner. For example, the following combinations can be realized.

That is, the first and second embodiments can be combined to be realized. In this case, the radio communication device 500 and the first radio communication device 600 described in the first embodiment can also be realized as the base station device 100 and the mobile station device 200, described in the second embodiment, respectively. Alternatively, the radio communication device 500 and the first radio communication device 600 described in the first embodiment can also be realized as the mobile station device 200 and the base station device 100 described in the second embodiment. Accordingly, the control unit 520 in the first embodiment may correspond to the control unit 104 of the base station device 100 or the control unit 204 of the mobile station device 200 in the second embodiment. The function of the control unit 520 described in the first embodiment may be realized in the control unit 104 of the base station device 100 or the control unit 204 of the mobile station device 200.

The second embodiment and other embodiments can also be combined to be realized. In this case, the base station device 100 and the mobile station device 200 can also be realized as the base station device 100 and the mobile station device 200 described in the other embodiments, respectively. In this case, the control unit 104 according to the second embodiment in the base station device 100 may correspond to, for example, the processor 112 according to the other embodiments so that the function of the control unit 104 can be executed in the processor 112. The control unit 204 according to the second embodiment in the mobile station device 100 may correspond to, for example, the processor 212 according to the other embodiments so that the function of the control unit 204 can be executed in the processor 212.

Further, the first embodiment and other embodiments can also be combined to be realized. In this case, the radio communication device 500 and the first radio communication device 600 described in the first embodiment can also be realized as the base station device 100 and the mobile station device 200 (or the mobile station device 200 and the base station device 100) described in the other embodiments. Accordingly, the control unit 520 in the first embodiment corresponds to the processor 112 or 212 in the other embodiments so that the function of the control unit 520 can be executed in the processor 112 or 212.

All examples and conditional language recited herein of the RFID tag and the high frequency circuit are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
a communication circuit configured to transmit and receive a signal to and from other radio communication device; and
a control circuit configured to cause the communication circuit to transmit, through a first radio resource on a physical uplink control channel (PUCCH) in a first layer different from a second layer:
  transmission control protocol (TCP) acknowledgement (ACK) or TCP negative acknowledgement (NACK) for TCP data; and
  second acknowledgement information, the second acknowledgement information indicating whether data in the first layer is normally received,
wherein the transmitting of the TCP ACK or TCP NACK and of the second acknowledgement information is configured to
  select, after acquiring control information in a second control channel in the first layer, the first PUCCH radio resource to be used in the transmitting of the TCP ACK or TCP NACK and of the second acknowledgement information, the selected first PUCCH radio resource indicating the TCP ACK or TCP NACK by a position of the selected first PUCCH radio resource, the position of the selected first PUCCH radio resource corresponding to an index indicating a position of a component in the second control channel, the component including the control information which includes one or more of parameters regarding a second radio resource for a first signal including the data, map the second acknowledgement information into the selected first PUCCH radio resource, and based on the first PUCCH radio resource mapped with the second acknowledgement information, cause the communication circuit to transmit: the TCP ACK or TCP NACK; and the second acknowledgement information, the position of the first PUCCH radio resource being selected so as to correspond to the TCP ACK or TCP NACK.

2. The radio communication device according to claim 1, wherein the second layer is an upper layer of the first layer, wherein the communication circuit is configured to receive a first signal in the first layer and transmit a second signal in the first layer, the first signal being configured to include data in the second layer, the second signal being configured to include the TCP ACK or TCP NACK for the data in the second layer.

3. The radio communication device according to claim 1, wherein the second acknowledgement information for the signal of the first layer is HARQ acknowledgement (ACK) or HARQ negative acknowledgement (NACK) for a signal in a medium access control (MAC) layer.

4. The radio communication device according to claim 1, wherein when the control information for the radio communication device is stored into a plurality of components in the second control channel, the control circuit is configured to select the first PUCCH radio resource based on a smallest index from among a plurality of indices corresponding to the plurality of components.

5. The radio communication device according to claim 1, wherein the second control channel is a physical downlink control channel (PDCCH), and the component in the second control channel is a control channel element (CCE) included in the PDCCH, the index is a CCE index.

6. The radio communication device according to claim 1, wherein the control circuit is configured to cause the communication circuit to transmit the TCP ACK or TCP NACK first acknowledgement information by using a PUCCH format configured to support 32 component carrier (CC).

7. The radio communication device according to claim 1, wherein the control circuit is configured to cause the communication circuit to transmit the TCP ACK or TCP NACK by using a PUCCH format configured to transmit a number of bits greater than a case of transmission executed using PUCCH format 3.

8. The radio communication device according to claim 1, wherein the data in the second layer is transmission control protocol (TCP) data, and wherein the control circuit is configured to insert information corresponding to the TCP ACK or TCP NACK into a first region of a TCP header, the inserted information in the TCP header being used to determine whether a TCP packet from the radio communication device includes the TCP ACK or TCP NACK or another data other than the TCP ACK or TCP NACK.

9. The radio communication device according to claim 8, wherein the first region is an acknowledgement number region in the TCP header.

10. The radio communication device according to claim 1, wherein the data in the second layer is transmission control protocol (TCP) data, and wherein a data amount of the TCP data is used to determine whether a TCP packet from the radio communication device includes the TCP ACK or TCP NACK or another data other than the TCP ACK or TCP NACK.

11. The radio communication device according to claim 1, wherein the other radio communication device is a base station device or a mobile station device.

12. A radio communication system comprising:
a first radio communication device; and
second radio communication devices,
wherein at least one of the second radio communication devices includes
a second communication circuit configured to transmit and receive a signal to and from other radio communication device, and
a second control circuit configured to cause the second communication circuit to transmit, through a first radio resource on a physical uplink control channel (PUCCH) in a first layer;
transmission control protocol (TCP) acknowledgement (ACK) or TCP negative acknowledgement (NACK) for TCP data; and
second acknowledgement information, and
the second acknowledgement information indicating whether data in the first layer is normally received,
wherein the first radio communication device includes
a first communication circuit configured to receive, through the PUCCH in the first layer, the TCP ACK or TCP NACK from the at least one of the second radio communication devices,
wherein the transmitting of the TCP ACK or TCP NACK and of the second acknowledgement information is configured to
select, after acquiring control information in a second control channel in the first layer, the first PUCCH radio resource to be used in the transmitting of the TCP ACK or TCP NACK and of the second acknowledgement information, the selected first PUCCH radio resource indicating the TCP ACK or TCP NACK by a position of the selected first PUCCH radio resource, the position of the selected first PUCCH radio resource corresponding to an index indicating a position of a component in the second control channel, the component including the control information which includes one or more of parameters regarding a second radio resource for a first signal including the data,
map the second acknowledgement information into the selected first PUCCH radio resource, and
based on the first PUCCH radio resource mapped with the second acknowledgement information, cause the second communication circuit to transmit: the TCP ACK or TCP NACK; and the second acknowledgement information, the position of the first PUCCH radio resource being selected so as to correspond to the TCP ACK or TCP NACK.

13. A radio communication method in a radio communication system including a first radio communication device and second radio communication devices, the radio communication method comprising:
causing a communication circuit of any of the second radio communication devices to receive a first signal in a first layer, the first signal being configured to include data in a second layer different from the first layer;
causing the communication circuit to transmit, through a first radio resource on a physical uplink control channel (PUCCH) in the first layer:

transmission control protocol (TCP) acknowledgement (ACK) or TCP negative acknowledgement (NACK) for TCP data; and second acknowledgement information, the second acknowledgement information indicating whether data in the first layer is normally received, wherein the transmitting of the TCP ACK or TCP NACK and of the second acknowledgement information is configured to select, after acquiring control information in a second control channel in the first layer, the first PUCCH radio resource to be used in the transmitting of the TCP ACK or TCP NACK and of the second acknowledgement information, the selected first PUCCH radio resource indicating the TCP ACK or TCP NACK by a position of the selected first PUCCH radio resource, the position of the selected first radio resource corresponding to an index indicating a position of a component in the second control channel, the component including the control information which includes one or more of parameters regarding a second radio resource for the first signal including the data, map the second acknowledgement information into the selected first PUCCH radio resource, and based on the first PUCCH radio resource mapped with the second acknowledgement information, cause the communication circuit to transmit: the TCP ACK or TCP NACK; and the second acknowledgement information, the position of the first PUCCH radio resource being selected so as to correspond to the TCP ACK or TCP NACK.

* * * * *